(12) United States Patent
Ren et al.

(10) Patent No.: US 11,303,410 B2
(45) Date of Patent: Apr. 12, 2022

(54) DATA TRANSMISSION METHOD, DESCRAMBLING METHOD, DEMODULATION METHOD AND DEVICES

(71) Applicant: VIVO MOBILE COMMUNICATION CO., LTD., Chang'an Dongguan (CN)

(72) Inventors: Qianyao Ren, Chang'an Dongguan (CN); Zichao Ji, Chang'an Dongguan (CN); Xiaodong Shen, Chang'an Dongguan (CN); Na Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/959,816

(22) PCT Filed: Jan. 11, 2019

(86) PCT No.: PCT/CN2019/071372
§ 371 (c)(1),
(2) Date: Jul. 2, 2020

(87) PCT Pub. No.: WO2019/137480
PCT Pub. Date: Jul. 18, 2019

(65) Prior Publication Data
US 2020/0374072 A1    Nov. 26, 2020

(30) Foreign Application Priority Data
Jan. 12, 2018    (CN) .......................... 201810032423.X

(51) Int. Cl.
*H04W 72/04* (2009.01)
*H04L 5/00* (2006.01)

(52) U.S. Cl.
CPC .......... *H04L 5/0048* (2013.01); *H04L 5/0007* (2013.01); *H04W 72/042* (2013.01)

(58) Field of Classification Search
CPC ... H04L 5/0053; H04L 1/0061; H04L 1/0025; H04L 1/0031; H04L 5/0023;
(Continued)

(56) References Cited

U.S. PATENT DOCUMENTS

2013/0039284 A1    2/2013  Marinier et al.
2013/0188558 A1    7/2013  Nam et al.
(Continued)

FOREIGN PATENT DOCUMENTS

| CN | 101772179 A | 7/2010 |
|----|-------------|--------|
| CN | 103259635 A | 8/2013 |

(Continued)

OTHER PUBLICATIONS

Extended European Search Report for related Application No. 19738806.9; reported on Mar. 29, 2021.
(Continued)

*Primary Examiner* — Eva Y Puente
(74) *Attorney, Agent, or Firm* — von Briesen & Roper, s.c.

(57) ABSTRACT

A data transmission method includes: generating a scrambling sequence in accordance with one or more first parameters, the one or more first parameters being determined in accordance with a predefined applied scenario and/or high-layer indication information; scrambling DCI using the generated scrambling sequence; and transmitting the scrambled DCI to a UE.

20 Claims, 5 Drawing Sheets

(58) Field of Classification Search
CPC ... H04L 5/0051; H04L 5/0094; H04L 1/1819;
H04L 1/1887; H04L 1/1854; H04L
5/0007; H04L 1/0003; H04W 72/042;
H04W 74/0833; H04W 76/11; H04W
72/04; H04W 72/0446; H04W 72/046;
H04W 72/1289; H04W 76/27; H04W
72/14; H04W 74/006; H04W 72/0413;
H04W 72/0466; Y02D 30/70; Y02D
70/1262
USPC .................................................. 370/330, 329
See application file for complete search history.

(56) References Cited

U.S. PATENT DOCUMENTS

| | | | |
|---|---|---|---|
| 2015/0215931 A1* | 7/2015 | Aiba | H04L 1/1893 370/329 |
| 2017/0105166 A1 | 4/2017 | Lee et al. | |
| 2020/0275491 A1* | 8/2020 | Ren | H04W 72/042 |
| 2021/0168188 A1* | 6/2021 | Fujishiro | H04W 76/27 |
| 2021/0194555 A1* | 6/2021 | Lu | H04L 5/0091 |

FOREIGN PATENT DOCUMENTS

| | | |
|---|---|---|
| CN | 103312398 A | 9/2013 |
| CN | 106658720 A | 5/2017 |
| CN | 107241123 A | 10/2017 |
| EP | 2582074 A2 | 4/2013 |
| JP | 2014508471 A | 4/2014 |
| JP | 2017510224 A | 4/2017 |
| WO | 2013174167 A1 | 11/2013 |

OTHER PUBLICATIONS

LG Electronics, "Discussion on PDCCH structure", Oct. 9-13, 2017, 3GPP TSG RAN WG1 Meeting 90bis. Prague, Czech Republic.
International Search Report & Written Opinion related to Application No. PCT/CN2019/071372; reported on Jul. 23, 2020.
Chinese Office Action for related Chinese Application No. 201810032423.X; reported on Oct. 19, 2020.
Ericsson, "RNTI and Scrambling for DCI", Oct. 9-13, 2017, 3GPP TSG RAN WG1 Meeting 90bis, Prague, CZ.
Chinese Office Action for related Chinese Application No. 201810032423.X; reported on Feb. 3, 2021.
Supplemental Partial European Search Report for related Application No. 19738806.9; reported on Feb. 3, 2021.
3rd Generation Partnership Project, "Technical Specification Group Radio Access Network; NR; Physical channels and modulation", Dec. 2017, 3GPP TS 38.211 V15.0.0.
Ericsson, "Further details on scrambling", Sep. 18-21, 2017, 3GPP TSG RAN WG1 Meeting AH_NR#3, Nagoya, Japan.
Notice of Reasons for Refusal for related Japanese Patent Application No. 2020-537686; reported on Sep. 29, 2021.
Notification of Reasons for Refusal related to Korean Application No. 10-2020-7019466; reported on Sep. 28, 2021.
Intel Corporation; "EPDCCH scrambling sequence generation"; 3GPP TSG-TAN WG1 Meeting #70bis; San Diego, USA, Oct. 8-12, 2012, R1-124121.
Vivo; "Remaining issued on PDCCH structure"; 3GPP TSG RAN WG1 Meeting AH 1801; Vancouver, Canada, Jan. 22-26, 2018, R1-1800195.
Ericsson, 3rd Generation Partnership Project; Technical Specification Group Radio Access Network; NR; Physical channels and modulation (Release 15), 3GPP TS 38.211, V2.0.0, Dec. 2017.

* cited by examiner

DATA TRANSMISSION METHOD, DESCRAMBLING METHOD, DEMODULATION METHOD AND DEVICES

CROSS-REFERENCE TO RELATED APPLICATION

The present application is the U.S. national phase of PCT Application No. PCT/CN2019/071372 filed on Jan. 11, 2019, which claims a priority of the Chinese patent application 201810032423.X filed on Jan. 12, 2018, which are incorporated herein by reference in their entirety.

TECHNICAL FIELD

The present disclosure relates to the field of communication technology, in particular to a data transmission method, a descrambling method, a demodulation method and devices.

BACKGROUND

Downlink Control Information (DCI) is carried by a Physical Downlink Control Channel (PDCCH). As specified in radio access technical standards, e.g., a Long Term Evolution (LTE) standard, it is necessary to scramble the DCI before the transmission thereof.

In the related art, there is such a problem that merely a method for generating a scrambling sequence is provided, so the generated scrambling sequence may not be able to meet the requirements on data transmission in a complicated and changeable data transmission scenario in a New Radio (NR) system.

SUMMARY

In a first aspect, the present disclosure provides in some embodiments a data transmission method for a network device, including: generating a scrambling sequence in accordance with one or more first parameters, the one or more first parameters being determined in accordance with a predefined applied scenario and/or high-layer indication information; scrambling DCI using the generated scrambling sequence; and transmitting the scrambled DCI to a User Equipment (UE).

In a second aspect, the present disclosure provides in some embodiments a data transmission method for a network device, including: generating a DeModulation Reference Signal (DMRS) sequence in accordance with one or more second parameters, the one or more second parameters being determined in accordance with a predefined applied scenario and/or high-layer indication information; and transmitting data to a UE using the DMRS sequence.

In a third aspect, the present disclosure provides in some embodiments a descrambling method for a UE, including: generating a scrambling sequence in accordance with one or more first parameters, the one or more first parameters being determined in accordance with a predefined applied scenario or indication information from a network device; and descrambling scrambled DCI received from the network device using the generated scrambling sequence.

In a fourth aspect, the present disclosure provides in some embodiments a demodulation method for a UE, including: generating a DMRS sequence in accordance with one or more second parameters, the one or more second parameters being determined in accordance with a predefined applied scenario or indication information from a network device; and demodulating a received data signal using the DMRS sequence, so as to acquire scrambled DCI.

In a fifth aspect, the present disclosure provides in some embodiments a network device, including: a sequence generation unit configured to generate a scrambling sequence in accordance with one or more first parameters, the one or more first parameters being determined in accordance with a predefined applied scenario and/or high-layer indication information; a scrambling unit configured to scramble DCI using the generated scrambling sequence; and a transmission unit configured to transmit the scrambled DCI to a UE.

In a sixth aspect, the present disclosure provides in some embodiments a network device, including: a sequence generation unit configured to generate a DMRS sequence in accordance with one or more second parameters, the one or more second parameters being determined in accordance with a predefined applied scenario and/or high-layer indication information; and a transmission unit configured to transmit data to a UE using the DMRS sequence.

In a seventh aspect, the present disclosure provides in some embodiments a UE, including: a generation unit configured to generate a scrambling sequence in accordance with one or more first parameters, the one or more first parameters being determined in accordance with a predefined applied scenario or indication information from a network device; and a descrambling unit configured to descramble scrambled DCI received from the network device using the generated scrambling sequence.

In an eighth aspect, the present disclosure provides in some embodiments a UE, including: a generation unit configured to generate a DMRS sequence in accordance with one or more second parameters, the one or more second parameters being determined in accordance with a predefined applied scenario or indication information from a network device; and a demodulation unit configured to demodulate a received data signal using the DMRS sequence, so as to acquire scrambled DCI.

In a ninth aspect, the present disclosure provides in some embodiments a network device, including a processor, a memory, and a computer program stored in the memory and executed by the processor. The processor is configured to execute the computer program so as to implement the data transmission method in the first aspect.

In a tenth aspect, the present disclosure provides in some embodiments a computer-readable storage medium storing therein a computer program. The computer program is executed by a processor so as to implement the data transmission method in the first aspect.

In an eleventh aspect, the present disclosure provides in some embodiments a network device, including a processor, a memory, and a computer program stored in the memory and executed by the processor. The processor is configured to execute the computer program so as to implement the data transmission method in the second aspect.

In a twelfth aspect, the present disclosure provides in some embodiments a computer-readable storage medium storing therein a computer program. The computer program is executed by a processor so as to implement the data transmission method in the second aspect.

In a thirteenth aspect, the present disclosure provides in some embodiments a network device, including a processor, a memory, and a computer program stored in the memory and executed by the processor. The processor is configured to execute the computer program so as to implement the descrambling method in the third aspect.

In a fourteenth aspect, the present disclosure provides in some embodiments a computer-readable storage medium storing therein a computer program. The computer program is executed by a processor so as to implement the descrambling method in the third aspect.

In a fifteenth aspect, the present disclosure provides in some embodiments a UE, including a processor, a memory, and a computer program stored in the memory and executed by the processor. The processor is configured to execute the computer program so as to implement the demodulation method in the fourth aspect.

In a sixteenth aspect, the present disclosure provides in some embodiments a computer-readable storage medium storing therein a computer program. The computer program is executed by a processor so as to implement the demodulation method in the fourth aspect.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure. The expression "and/or" in the specification and the appended claims is used to represent at least one of listed objects.

Schemes in the embodiments of the present disclosure may be applied to various communication systems, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE)/Long Term Evolution-Advanced (LTE-A) system, Narrow Band Internet of Things (NB-IoT) system, Machine-Type Communication (MTC) system, or New Radio (NR) system.

A UE, also called as mobile terminal or mobile user equipment, may communicate with one or more core networks via a Radio Access Network (RAN). The UE may be a mobile terminal, e.g., mobile phone (or cellular phone), and a computer having a mobile terminal, e.g., portable, pocket-sized, handheld, built-in or vehicle-mounted mobile device, which are capable of exchanging voice and/or data with the RAN.

A network device may be a device deployed in the RAN and configured to provide a wireless communication function for the UE. The network device may be a base station, e.g., a Base Transceiver Station (BTS) in the GSM or the CDMA system, a Node B (NB) in the WCDMA system, an evolved Node B (eNB) in the LTE system, or a gNB in a 5G system.

The present disclosure will be described hereinafter in more details in conjunction with the drawings and embodiments.

Figure 1:
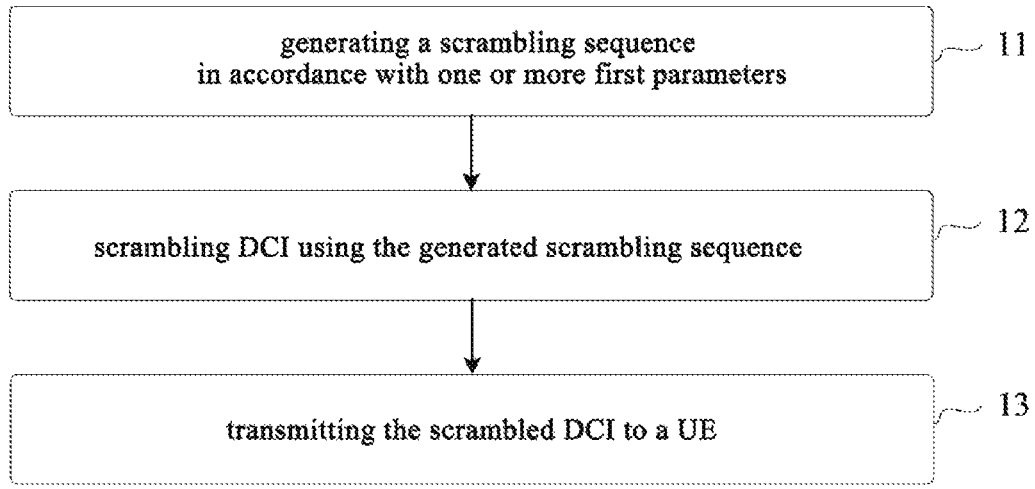
FIG. 1 is a flow chart of a data transmission method according to some embodiments of the present disclosure.

As shown in FIG. 1, the present disclosure provides in some embodiments a data transmission method for a network device, which includes the following Steps.

Step 11: generating a scrambling sequence in accordance with one or more first parameters, the one or more first parameters being determined in accordance with a predefined applied scenario and/or high-layer indication information.

In the embodiments of the present disclosure, the one or more first parameters may be one or more parameters for generating the scrambling sequence.

For example, the one or more first parameters may include, but not limited to, a parameter for generating a binary number. Usually, the binary number refers to a binary number for initializing a Gold sequence to acquire the scrambling sequence.

The predefined applied scenario may include any predefined applied scenario capable of being used to determine the one or more first parameters.

For example, the predefined applied scenario may include at least one of the following scenarios.

1. Scenario in which DCI is to be transmitted using a licensed frequency band. In this scenario, the one or more first parameters may include, e.g., a Radio Network Temporary Identity (RNTI). In the case that a scrambling identifier has been configured, the one or more first parameters may also include, e.g., the RNTI and the scrambling identifier. Of course, in the case that the scrambling identifier has been configured, the one or more first parameters may also include the RNTI and any other parameter other than the scrambling identifier. The other parameters may include at least one of: an identifier of a Control Resource Set (CORESET) where a Physical Uplink Control Channel (PUCCH) resource is located, an identifier of a search space where the DCI is located, an index of a slot for the transmission of the DCI in a radio frame or a radio subframe; and an index of an Orthogonal Frequency Division Multiplexing (OFDM) system for the transmitting of the DCI.

2. Scenario in which the DCI is to be transmitted using an unlicensed frequency band. In this scenario, the one or more first parameters may include, e.g., the RNTI. In the case that a scrambling identifier has been configured, the one or more first parameters may also include, e.g., the RNTI and the scrambling identifier. Of course, in the case that the scrambling identifier has been configured, the one or more first parameters may also include the RNTI and any other parameter other than the scrambling identifier (e.g., the other parameters mentioned hereinabove).

3. Scenario in which the one or more first parameters include the scrambling identifier. In this scenario, the one or more first parameters may include, e.g., the RNTI, or include the RNTI and the scrambling identifier. Of course, the one or more first parameters may also include the RNTI, the scrambling identifier and the other parameters mentioned hereinabove.

4. Scenario in which the one or more first parameters do not include the scrambling identifier. In this scenario, the one or more first parameters may include, e.g., the RNTI, or include the RNTI and a Physical Cell Identifier (PCI), or include the RNTI, the PCI and the other parameters mentioned hereinabove.

The high-layer indication information may include any high-layer indication information capable of being used to determine the one or more first parameters.

For example, the high-layer indication information may include at least one of: information about a frequency band license type; information representing whether the scrambling identifier has been configured; information about at least one of the one or more first parameters when the scrambling identifier has been configured; and information about at least one of the one or more first parameters when the scrambling identifier has not been configured.

With respect to the step of determining the one or more first parameters in accordance with the high-layer indication information, for example, when the high-layer indication information includes the information about the frequency band license type and the information indicates an unlicensed frequency band, the one or more first parameters may include the RNTI and the scrambling identifier in the case that the scrambling identifier has been configured. Alternatively, in the case that the scrambling identifier has been configured, the one or more first parameters may include the RNTI, the scrambling identifier and the other parameters mentioned hereinabove.

When the high-layer indication information includes the information representing whether the scrambling identifier has been configured and the information indicates that no scrambling identifier has been configured, the one or more first parameters may include, e.g., the RNTI, time-domain information about the DCI and the PCI.

When the high-layer indication information includes the information representing whether the scrambling identifier has been configured and the information indicates that the scrambling identifier has been configured, the one or more first parameters may include, e.g., the RNTI and the scrambling identifier.

When the high-layer indication information includes the information about at least one of the one or more first parameters when the scrambling identifier has been configured, the one or more first parameters may include, e.g., the RNTI and the scrambling identifier. Alternatively, in the case that the scrambling identifier has been configured, the one or more first parameters may include, e.g., the RNTI, the scrambling identifier and the other parameters mentioned hereinabove.

When the high-layer indication information includes the information about at least one of the one or more first parameters when the scrambling identifier has not been configured, the one or more first parameters may include, e.g., the RNTI and the PCI. Alternatively, the one or more first parameters may include the RNTI, the PCI and the other parameters mentioned hereinabove.

Prior to generating the scrambling sequence, the network device may at first determine the one or more first parameters for the generation of the scrambling sequence in accordance with the predefined applied scenario and/or high-layer indication information.

The network device may determine the one or more first parameters in accordance with the high-layer indication information preferentially, rather than the predefined applied scenario. The high-layer indication information for determining the one or more first parameters may be high-layer indication information received previously.

Alternatively, the network device may also define the one or more first parameters in accordance with the predefined applied scenario at first. When it is merely able to determine, in accordance with the predefined applied scenario, that the scenario is a scenario in which the one or more first parameters include the scrambling identifier but it is impossible to determine the parameters in the one or more first parameters apart from the scrambling identifier, the other first parameter, except the scrambling identifier, may be further determined in accordance with the high-layer indication information.

Of course, when it is able for the network device to determine each first parameter for generating the scrambling sequence in accordance with the predefined applied scenario, it is unnecessary to determine the one or more first parameters in accordance with the high-layer indication information.

In the embodiments of the present disclosure, when the one or more first parameters is capable of being determined in accordance with the high-layer indication information, the one or more first parameters may meet at least one of the following configuration modes: at least one of the one or more first parameters is configured through the high-layer indication information on the basis of a cell; at least one of the one or more first parameters is configured through the high-layer indication information on the basis of a carrier; at least one of the one or more first parameters is configured through the high-layer indication information on the basis of a bandwidth type; and at least one of the one or more first parameters is configured through the high-layer indication information on the basis of a CORESET.

When at least one of the one or more first parameters is configured through the high-layer indication information on the basis of a cell, it means that the high-layer indication information may be used to indicate at least one of the one or more first parameters for generating the scrambling sequence to the network device when the DCI is transmitted by the UE in one or more cells.

When at least one of the one or more first parameters is configured through the high-layer indication information on the basis of a carrier, it means that the high-layer indication information may be used to indicate at least one of the one or more first parameters for generating the scrambling sequence to the network device when the DCI is transmitted using one or more carriers.

When at least one of the one or more first parameters is configured through the high-layer indication information on the basis of a bandwidth type, it means that the high-layer indication information may be used to indicate at least one of the one or more first parameters for generating the scrambling sequence to the network device when the DCI is transmitted using one or more bandwidth types.

When at least one of the one or more first parameters is configured through the high-layer indication information on the basis of a CORESET, it means that the high-layer indication information may be used to indicate at least one of the one or more first parameters for generating the scrambling sequence to the network device when the DCI is transmitted using one or more CORESETs.

In the embodiments of the present disclosure, some identifiers representing the predefined applied scenarios may be preset and stored in the network device. For example, when the identifier is 001, it means that the predefined applied scenario is a scenario in which the DCI is to be transmitted on an unlicensed frequency band; and when the identifier is 000, it means that the predefined applied scenario is a scenario in which the DCI is to be transmitted on a licensed frequency band. Similarly, when the identifier is 011, it means that the predefined applied scenario is a scenario in which the one or more first parameters include the scrambling identifier (regardless of whether the frequency band is licensed or unlicensed); and when the identifier is 111, it means that the predefined applied scenario is a scenario in which the one or more first parameters include the other parameters mentioned hereinabove except the scrambling identifier (regardless of whether the frequency band is licensed or unlicensed).

For different predefined applied scenarios, the network device may generate $c_{init}^{scramble}$ using a scrambling sequence generation mode of $c_{init}^{scramble}$ matching each predefined applied scenario. Here, the scrambling sequence generation mode may include the one or more first parameters for generating $c_{init}^{scramble}$ as well as formulae for generating $c_{init}^{scramble}$.

In the embodiments of the present disclosure, calculation formulae of $c_{init}^{scramble}$ matching the predefined applied scenarios may be stored in the network device in association with the identifiers of the predefined applied scenarios, so it is able to determine the calculation formula of the binary number $c_{init}^{scramble}$ in accordance with the identifier of the predefined applied scenario, i.e., determine the calculation formula of the binary number $c_{init}^{scramble}$ in accordance with the predefined applied scenario.

With respect to the circumstance where the one or more first parameters are determined in accordance with the high-layer indication information, the high-layer indication information may further include information about the calculation formulae of the binary number $c_{init}^{scramble}$, so the network device may determine the formula for the calculation of the binary number $c_{init}^{scramble}$ in accordance with the information included in the high-layer indication information. To be specific, the information may be a unique identifier of each formula. The network device may store in advance the calculation formulae of $c_{init}^{scramble}$ and the unique identifier of each calculation formula, so as to inquire the calculation formula corresponding to the unique identifier from the stored calculation formulae, and then calculate $c_{init}^{scramble}$ in accordance with the one or more first parameters through the calculation formula.

The formulae for calculating the binary number will be described hereinafter in more details.

As mentioned hereinabove, in the embodiments of the present disclosure, there are various circumstances for the contents in the one or more first parameters.

In a first circumstance, the one or more first parameters may include the RNTI.

In a second circumstance, when the scrambling identifier has been configured, the one or more first parameters may include the RNTI and the scrambling identifier.

In the second circumstance, the generating the scrambling sequence in accordance with the one or more first parameters may include the following steps.

At first, $c_{init}^{scramble}$ may be calculated in accordance with the following formula [1] or [2]:

$$c_{init}^{scramble} = (2^{16} \cdot n_{RNTI} + n_{ID}) \bmod 2^{31} \quad [1], \text{ and}$$

$$c_{init}^{scramble} = 2^{16} \cdot \lfloor n_{RNTI}/2 \rfloor + n_{ID} \quad [2],$$

where $c_{init}^{scramble}$ represents the binary number for initializing the scrambling sequence, $n_{RNTI}$ represents the RNTI, and $n_{ID}$ represents the scrambling identifier.

Then, the scrambling sequence may be generated in accordance with $c_{init}^{scramble}$ acquired through calculation.

In the second circumstance, the scrambling sequence generation mode may be applied to the scenario in which the DCI is to be transmitted through the PDCCH at the unlicensed frequency band.

One of the defects in the related art will be described hereinafter, and then advantages of the scrambling sequence generation mode in the second circumstance will be described through comparison.

In the related art, the scrambling sequence is generated in accordance with constant time-domain information. To be specific, a binary number $c_{init}$ for initializing the scrambling sequence is usually calculated through the following formula [3] and then the scrambling sequence is generated in accordance with $c_{init}$:

$$c_{init} = \lfloor n_s/2 \rfloor 2^9 + N_{ID}^{cell} \quad [3],$$

where $c_{init}$ represents the binary number for initializing the scrambling sequence, $n_s$ represents an index of a certain subframe for transmitting the DCI adopted in an LTE system (i.e., the constant time-domain information), and $N_{ID}^{cell}$ represents a PCI of a cell N.

The above-mentioned scrambling sequence initialization mode may be applied to the data transmission and reception at a Licensed Frequency Band (LFB). In a scenario where the data transmission and reception is performed at an Unlicensed Frequency Band (UFB), a transmission time point and a length of a radio frame change dynamically, so it is impossible to predict a subframe/slot for the transmission of the DCI, i.e., $n_s$. In this regard, before the PDCCH is in an idle state through Listen Before Talk (LBT) detection, it is impossible to initialize the scrambling sequence in advance. The scrambling sequence may be initialized merely after the PDCCH is in the idle state through the LBT detection, so there is a relatively large delay for the data transmission at the UFB.

However, when the above formula [1] or [2] is adopted, the scrambling sequence may be generated in advance independent of the time-domain information about the PDCCH. Once there is an available resource at the UFB through the LBT detection, a scrambling operation may be performed rapidly and then the DCI may be transmitted, i.e., it is unnecessary to generate the scrambling sequence when there is the available resource. As a result, it is able to reduce the delay for the data transmission at the UFB.

In a third circumstance, the one or more first parameters may include, apart from the RNTI and the scrambling identifier, at least one of: an identifier of a CORESET where a Physical Uplink Control Channel (PUCCH) resource is located; an identifier of a search space where the DCI is located; an index of a slot for the transmission of the DCI within a radio frame or radio subframe; and an index of an OFDM symbol for the transmission of the DCI.

In the third circumstance, when the one or more first parameters include the identifier of the CORESET, the generating the scrambling sequence in accordance with the one or more first parameters may include: calculating $c_{init}^{scramble}$ through a formula $c_{init}^{scramble}=(2^{16}*n_{RNTI}+n_{ID}^{CORESET}+n_{ID})\mod 2^{31}$ [4], where $c_{init}^{scramble}$ represents the binary number for initializing the scrambling sequence, $n_{RNTI}$ represents the RNTI, $n_{ID}^{CORESET}$ represents the identifier of the CORESET, and $n_{ID}$ represents the scrambling identifier; and generating the scrambling sequence in accordance with $c_{init}^{scramble}$ acquired through calculation.

In the third circumstance, when the one or more first parameters include the identifier of the search space, the generating the scrambling sequence in accordance with the one or more first parameters may include: calculating $c_{init}^{scramble}$ through a formula $c_{init}^{scramble}=(2^{16}*n_{RNTI}+n_{ID}^{SS}+n_{ID})\mod 2^{31}$ [5], where $c_{init}^{scramble}$ represents the binary number for initializing the scrambling sequence, $n_{RNTI}$ represents the RNTI, $n_{ID}^{SS}$ represents the identifier of the search space, and $n_{ID}$ represents the scrambling identifier; and generating the scrambling sequence in accordance with $c_{init}^{scramble}$ acquired through calculation.

In the third circumstance, when the one or more first parameters include the index of the slot within the radio frame or the radio subframe and the index of the OFDM symbol, the generating the scrambling sequence in accordance with the one or more first parameters may include: calculating $c_{init}^{scramble}$ through a formula $c_{init}^{scramble}=(2^{16}*n_{RNTI}+14n_s+l+1+n_{ID})\mod 2^{31}$ [6], where $c_{init}^{scramble}$ represents the binary number for initializing the scrambling sequence, $n_{RNTI}$ represents the RNTI, $n_s$ represents the index of the slot within the radio frame or the radio subframe, l represents the index of the OFDM symbol, and $n_{ID}$ represents the scrambling identifier; and generating the scrambling sequence in accordance with $c_{init}^{scramble}$ acquired through calculation.

In a fourth circumstance, the one or more first parameters may include, apart from the RNTI, time-domain information about the DCI and a PCI of a cell where the UE is located.

In the fourth circumstance, the generating the scrambling sequence in accordance with the one or more first parameters may include: calculating $c_{init}^{scramble}$ through a formula $c_{init}^{scramble}=(2^{10}\cdot n_{RNTI}(14n_s++1)+N_{ID}^{Cell})\mod 2^{31}$ [7], where $c_{init}^{scramble}$ represents the binary number for initializing the scrambling sequence, $n_{RNTI}$ represents the RNTI, $n_s$ represents the index of the slot for the transmission of the DCI within the radio frame or the radio subframe, l represents the index of the OFDM symbol for the transmission of the DCI, and $N_{ID}^{cell}$ represents the PCI; and generating the scrambling sequence in accordance with $c_{init}^{scramble}$ acquired through calculation.

Step 12: scrambling the DCI using the generated scrambling sequence.

Step 13: transmitting the scrambled DCI to the UE.

In the embodiments of the present disclosure, similar to the network device, the UE may also determine one or more second parameters in accordance with the predefined applied scenario. The predefined applied scenario and the formulae for calculating $c_{init}^{scramble}$ may be stored in the UE.

Of course, the UE may also determine the one or more first parameters in accordance with instruction information. Here, the instruction information may be determined by the network device in accordance with the high-layer indication information and/or the predefined application information and then transmitted to the UE. The instruction information transmitted by the network device to the UE may include the one or more first parameters as well as the identifiers of the formulae for calculating $c_{init}^{scramble}$. The UE may inquire the formula for calculating $c_{init}^{scramble}$ pre-stored locally and matching the identifier of the formula in the instruction information from the formulae in accordance with the formulae for calculating $c_{init}^{scramble}$ and the identifiers of the formulae.

Figure 2:
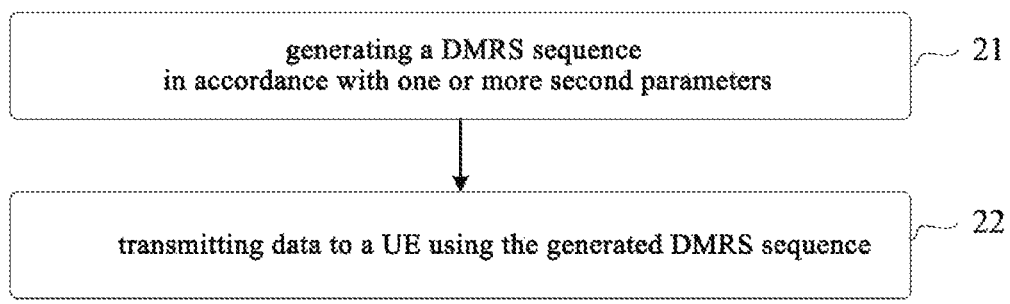
FIG. 2 is a flow chart of another data transmission method according to some embodiments of the present disclosure.

The present disclosure further provides in some embodiments a data transmission method for a network device which, as shown in FIG. 2, includes the following steps.

Step 21: generating a DMRS sequence in accordance with one or more second parameters. The one or more second parameters may be one or more parameters for the generation of the DMRS sequence, and may be determined in accordance a predefined applied scenario and/or high-layer indication information.

Modes for determining the one or more second parameters in accordance with the predefined applied scenario and/or the high-layer indication information may be similar to those for determining the one or more first parameters in accordance with the predefined applied scenario and/or the high-layer indication information, so the implementation thereof may refer to that of the modes for determining the one or more first parameters in accordance with the predefined applied scenario and/or the high-layer indication information mentioned hereinabove, which will not be particularly defined herein.

Step 22: transmitting data to a UE using the generated DMRS sequence.

In the embodiments of the present disclosure, there are various circumstances for the parameters in the one or more second parameters.

In a first circumstance, when a scrambling identifier has been configured, the one or more second parameters may include an RNTI.

In the first circumstance, $c_{init}^{scramble}$ may be calculated through a formula $c_{init}^{DMRS}=n_{ID}$ [8], where $c_{init}^{DMRS}$ represents a binary number for initializing the DMRS sequence, and $n_{ID}$ represents the scrambling identifier. Then, the DMRS sequence may be generated in accordance with $c_{init}^{DMRS}$ acquired through calculation.

In a second circumstance, apart from the scrambling identifier, the one or more second parameters may further include at least one of: an identifier of a CORESET where a PUCCH resource is located, an identifier of a search space where DCI is located; an index of a slot for the transmission of the DCI within a radio frame or radio subframe; and an index of an OFDM symbol for the transmission of the DCI.

In the second circumstance, when the one or more second parameters include the scrambling identifier and the identifier of the CORESET, $c_{init}^{DMRS}$ may be calculated through a formula $c_{init}^{DMRS}=2^{16}*n_{ID}^{CORESET}+n_{ID}$ [9], where $c_{init}^{DMRS}$ represents the binary number for initializing the DMRS sequence, $c_{ID}^{CORESET}$ represents the identifier of the CORESET, and $n_{ID}$ represents the scrambling identifier. Then, the DMRS sequence may be generated in accordance with $c_{init}^{DMRS}$ acquired through calculation.

In the second circumstance, when the one or more second parameters include the scrambling identifier and the identifier of the search space, $c_{init}^{DMRS}$ may be calculated through a formula $c_{init}^{DMRS}=2^{16}*n_{ID}^{SS}+n_{ID}$ [10], where $c_{init}^{DMRS}$ represents the binary number for initializing the DMRS sequence, $n_{ID}^{SS}$ represents the index of the OFDM symbol, and $n_{ID}$ represents the scrambling identifier. Then, the DMRS sequence may be generated in accordance with $c_{init}^{DMRS}$ acquired through calculation.

In the second circumstance, when the one or more second parameters include the scrambling identifier and the index of the OFDM symbol, $c_{init}^{DMRS}$ may be calculated through a formula $c_{init}^{DMRS}=2^{16}*(14n_s+l+1)+n_{ID}$ [11], where $c_{init}^{DMRS}$ represents the binary number for initializing the DMRS sequence, $n_{RNTI}$ represents the RNTI, $n_s$ represents the index, l represents the index of the OFDM symbol, and $n_{ID}$ represents the scrambling identifier. Then, the DMRS sequence may be generated in accordance with $c_{init}^{DMRS}$ acquired through calculation.

In a third circumstance, the one or more second parameters may include a PCI and time-domain information about a DMRS.

In the third circumstance, $c_{init}^{DMRS}$ may be calculated through a formula $c_{init}^{DMRS}=(14n_s+l+1)\cdot 2^{10}+N_{ID}^{Cell}$ [12], where $c_{init}^{DMRS}$ represents the binary number for initializing the DMRS sequence, $n_s$ represents the index of the slot for the transmission of the DCI within the radio frame or radio subframe, l represents the index of the OFDM symbol for the transmission of the DCI, and $N_{ID}^{cell}$ represents the PCI. Then, the DMRS sequence may be generated in accordance with $c_{init}^{DMRS}$ acquired through calculation.

In the embodiments of the present disclosure, similar to the network device, the UE may also determine one or more second parameters in accordance with the predefined applied scenario. The predefined applied scenario, the formulae for calculating $c_{init}^{DMRS}$ and identifiers of the formulae may be stored in the UE, like that mentioned hereinabove.

Of course, the UE may also determine the one or more second parameters and the formulae for calculating $c_{init}^{DMRS}$ in accordance with instruction information. Here, the instruction information may be determined by the network device in accordance with the high-layer indication information and/or the predefined application information and then transmitted to the UE. The instruction information transmitted by the network device to the UE may include the one or more second parameters as well as the formulae for calculating $c_{init}^{DMRS}$.

Figure 3:
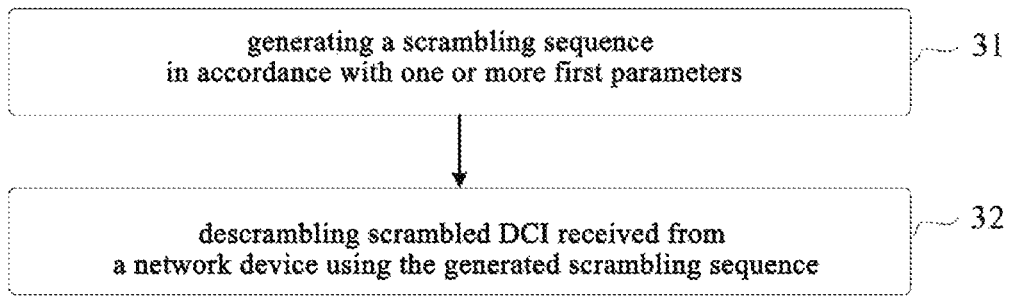
FIG. 3 is a flow chart of a descrambling method according to some embodiments of the present disclosure.

Corresponding to the first data transmission method mentioned hereinabove, the present disclosure further provides in some embodiments descrambling method for a UE which, as shown in FIG. 3, includes the following steps.

Step 31: generating a scrambling sequence in accordance with one or more first parameters. The one or more first parameters may be determined in accordance with a predefined applied scenario or indication information from a network device.

How to determine the one or more first parameters, contents in the one or more first parameters and how to generate the scrambling sequence in accordance with the one or more first parameters may refer to those mentioned hereinabove, and thus will not be particularly defined herein.

Step 32: descrambling scrambled DCI received from the network device using the generated scrambling sequence.

Figure 4:
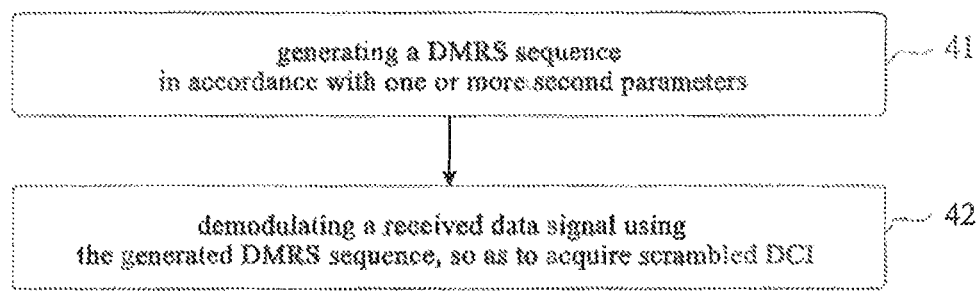
FIG. 4 is a flow chart of a demodulation method according to some embodiments of the present disclosure.

Corresponding to the second data transmission method mentioned hereinabove, the present disclosure further provides in some embodiments a descrambling method for a UE which, as shown in FIG. 4, includes the following steps.

Step 41: generating a DMRS sequence in accordance with one or more second parameters. The one or more second parameters may be determined in accordance with a predefined applied scenario or indication information from a network device.

How to determine the one or more second parameters, contents in the one or more second parameters and how to generate the scrambling sequence in accordance with the one or more second parameters may refer to those mentioned hereinabove, and thus will not be particularly defined herein.

Step 42: demodulating a received data signal using the generated DMRS sequence, so as to acquire scrambled DCI.

The defects in the conventional scrambling sequence generation mode will be described hereinafter, so as to facilitate a person skilled in the art to understand how to solve the problems in the related art using the schemes in the embodiments of the present disclosure.

First defect: a relatively large delay for the data transmission may probably occur.

As mentioned hereinabove, the conventional scrambling sequence initialization mode may be applied to the data transmission and reception at the LFB. In a scenario where the data transmission and reception is performed at the UFB, the transmission time point and the length of the radio frame change dynamically, so it is impossible to predict the sub-frame/slot for the transmission of the DCI, i.e., $n_s$. In this regard, before the PDCCH is in the idle state through (LBT detection, it is impossible to initialize the scrambling sequence in advance. The scrambling sequence may be initialized merely after the PDCCH is in the idle state through the LBT detection, so there is a relatively large delay for the data transmission at the UFB.

Second defect: it is impossible to select a corresponding sequence generation mode flexibly in accordance with a data transmission scenario.

As mentioned hereinabove with respect to the first defect, there is a relatively large delay for the data transmission at the UFB in the conventional scrambling sequence generation mode. However, according to a current communication standard, merely the scrambling sequence generation mode is provided on the basis of the constant time-domain information, so $c_{init}$ is calculated always through the formula [3] in the related art, no matter whether the data transmission scenario is a scenario in which the data is transmitted at the UFB or at the LFB, resulting in the above-mentioned first defect.

Hence, when the scrambling sequence is generated using a constant scrambling sequence generation mode, it is impossible to meet the requirements on the data transmission in a complicated and changeable data transmission scenario, i.e., to meet the requirements of a communication system, e.g., an NR system, in which the data transmission scenario is complicated and changeable. There is an urgent need to provide a new data transmission mode, so as to flexibly meet the requirements on the data transmission in different data transmission scenarios.

Through the schemes provided by the embodiments of the present disclosure, the scrambling sequence may be generated in accordance with the one or more first parameters, and the one or more first parameters may be determined in accordance with the predefined applied scenario and/or high-layer indication information. The schemes provided by the embodiments of the present disclosure may be flexibly adapted to the predefined applied scenario and/or the high-layer indication information, without any restraint from the scrambling sequence generation mode, so it is able to flexibly meet the requirements on the data transmission in different data transmission scenarios.

A person skilled in the art may make any modifications on the above calculation formulae, e.g., change some values in each formula. However, it should be appreciated that, any calculation formulae acquired through the modifications without any creative effect shall also fall within the scope of the present disclosure.

First Embodiment

In this embodiment, it is presumed that a CORESET for the transmission of Remaining Minimum System Information (RMSI), i.e., RMSI CORESET, has been configured by the network device through a Physical Broadcast Channel (PBCH).

In a circumstance where the DCI is to be transmitted using the configured RMSI CORESET, the network device may generate the scrambling sequence and the DMRS sequence as follows.

With respect to the scrambling sequence, the network device may calculate $c_{init}^{scramble}$ through a formula $c_{init}^{scramble}=(2^{10} \cdot n_{RNTI} \cdot (14n_s+l+1)+N_{ID}^{Cell}) \bmod 2^{31}$ [13] in accordance with such parameter as the RNTI corresponding to actually-scheduled data and the PCI of the cell where the UE for receiving the DCI is located, where $c_{init}^{scramble}$ represents the binary number for initializing the scrambling sequence, $n_{RNTI}$ represents the RNTI corresponding to actually-scheduled data, i.e., the RNTI of the UE for receiving the DCI, $n_s$ represents the index of the slot for the transmission of the DCI within the radio frame or the radio subframe, l represents the index of the OFDM symbol for the transmission of the DCI, and $N_{ID}^{cell}$ represents the PCI of the cell where the UE is located.

Next, the network device may initialize a Gold sequence for constructing the scrambling sequence using $c_{init}^{scramble}$, so as to acquire the scrambling sequence. Because the Gold sequence is initialized using the binary number to acquire the scrambling sequence, a relatively mature technology may be adopted, which will not be particularly defined herein.

It should be appreciated that, the actually-scheduled data may be RMSI, Open System Interconnection (OSI) or paging.

After the generation of the scrambling sequence, the network device may scramble the DCI to be transmitted through the PDCCH using the scrambling sequence, so as to acquire the scrambled DCI. Next, the network device may transmit the scrambled DCI to the UE through the PDCCH. How to descramble the received scrambled DCI by the UE will be described hereinafter.

For the DMRS sequence, the network device may generate the DMRS sequence for the CORESET in accordance with the PCI and the time-domain information about the DMRS. For example, the network device may calculate $c_{init}^{DMRS}$ through a formula $c_{init}^{DMRS}=(14n_s+l+1) \cdot 2^{10}+N_{ID}^{Cell}$ [14], where $c_{init}^{DMRS}$ represents the binary number for initializing the DMRS sequence, $n_s$ represents the index of the slot for the transmission of the DCI within the radio frame or radio subframe, l represents the index of the OFDM symbol for the transmission of the DMRS sequence, and $N_{ID}^{cell}$ represents the PCI of the cell where the UE is located.

Next, the network device may initialize the Gold sequence for constructing the DMRS sequence using $c_{init}^{DMRS}$, so as to acquire the DMRS sequence. Because the Gold sequence for constructing the DMRS sequence is initialized using the binary number to acquire the DMRS sequence, a relatively mature technology may be adopted, which will not be particularly defined herein.

After the generation of the DMRS sequence, the network device may transmit the data to the UE using the generated DMRS sequence. How to generate the DMRS sequence and descramble the data using the DMRS sequence by the UE will be described hereinafter.

Based on the above-mentioned sequence generation modes adopted by the network device, different cells may have different PCIs, and in the case that the DCI is to be transmitted using the configured RMSI CORESET, the DMRS sequences generated using the PCIs of different cells may be different from each other, and the scrambling sequences generated using the PCIs of different cells may be different from each other too. As a result, it is able for the UEs in different cells to differentiate and successfully demodulate the received PDCCHs.

How to generate the scrambling sequence and the DMRS sequence for the PDCCH by the network device has been described hereinabove in the first embodiment, and how to generate the scrambling sequence and the DMRS sequence for the PDCCH by the UE will be described hereinafter.

For the DMRS sequence, the UE may calculate $c_{init}^{DMRS}$ using the above-mentioned formulae in accordance with the PCI of the cell where the UE is located and the time-domain information about the DMRS, and then generate the DMRS sequence for the PDCCH in accordance with $c_{init}^{DMRS}$.

Next, the UE may demodulate the received scrambled DCI using the DMRS sequence.

For the scrambling sequence, the network device may calculate $c_{init}^{scramble}$ through the above-mentioned formulae in accordance with the RNTI corresponding to the to-be-demodulated data, and then generate the scrambling sequence for the PDCCH in accordance with $c_{init}^{scramble}$.

Next, the UE may demodulate the scrambled DCI acquired through successful demodulation using the scrambling sequence.

In the first embodiment, when it is further presumed that an additional CORESET has been configured by the network device for the UE to receive the PDCCH and a corresponding scrambling identifier has been configured for the CORESET, the network device may calculate $c_{init}^{scramble}$ through one of formulae:

$$c_{init}^{scramble}=(2^{16} \cdot n_{RNTI}+n_{ID}) \bmod 2^{31} \quad [15]; \text{ and}$$

$$c_{init}^{scramble}=2^{16} \cdot \lfloor n_{RNTI}/2 \rfloor + n_{ID} \quad [16]$$

in accordance with the scrambling identifier, where $c_{init}^{scramble}$ represents the binary number for initializing the scrambling sequence, $n_{RNTI}$ represents the RNTI, and $n_{ID}$ represents the scrambling identifier.

Then, the network device may generate the scrambling sequence in accordance with $c_{init}^{scramble}$ acquired through calculation, descramble the DCI using the scrambling sequence, and transmit the scrambled DCI to the UE through the PDCCH.

In addition, the network device may calculate $c_{init}^{scramble}$ through a formula $c_{init}^{DMRS}=n_{ID}$ [17] in accordance with the scrambling identifier, where $c_{init}^{DMRS}$ represents the binary number for initializing the DMRS sequence, and $n_{ID}$ represents the scrambling identifier.

Then, the network device may generate the DMRS sequence in accordance with $c_{init}^{DMRS}$ acquired through calculation, and transmit the data to the UE through the DMRS sequence.

The UE may calculate $c_{init}^{DMRS}$ through a formula $c_{init}^{DMRS}=n_{ID}$, and then generate the DMRS sequence in accordance $c_{init}^{DMRS}$. Hence, the UE may demodulate the received scrambled DCI using the generated DMRS sequence.

In addition, the UE may calculate $c_{init}^{scramble}$ through one of formulae:

$$c_{init}^{scramble}=(2^{16} \cdot n_{RNTI}+n_{ID}) \bmod 2^{31} \quad [18]; \text{ and}$$

$$c_{init}^{scramble}=2^{16} \cdot \lfloor n_{RNTI}/2 \rfloor + n_{ID} \quad [19],$$

and then generate the scrambling sequence in accordance with $c_{init}^{scramble}$. Next, the UE may descramble the scrambled DCI acquired through successful demodulation using the scrambling sequence.

In the first embodiment of the present disclosure, when the scrambling sequence is generated using the scrambling identifier, a resultant technical effect will be described as follows.

The scrambling identifier configured with respect to the CORESET is independent of the PCI of the cell, so the neighboring cells having different PCIs may use a same scrambling identifier to generate a same scrambling sequence. For a UE located at a cell edge, on one hand, the network device corresponding to the cell may scramble the DCI using the scrambling sequence, and then transmit the scrambled DCI to the UE through the CORESET. On the other hand, the network device corresponding to a cell may transmit the DCI to a network device corresponding to a neighboring cell, so that the network device corresponding to the neighboring cell may scramble the DCI using the scrambling sequence generated in accordance with the scrambling identifier, and transmit the scrambled DCI to the UE through the CORESET. In this way, the UE may receive two pieces of scrambled DCI, and combine the DCI acquired through descrambling, so as to acquire complete DCI data. As a result, it is able to prevent the occurrence of a relatively low reception success rate of the PDCCH when the UE is at the cell edge.

In addition, when the scrambling sequence is generated through the formula $c_{init}^{scramble}=(2^{16} \cdot n_{RNTI}+n_{ID}) \bmod 2^{31}$ or $c_{init}^{scramble}=2^{16} \cdot \lfloor n_{RNTI}/2 \rfloor + n_{ID}$, the technical effect will be described hereinafter in comparison to the related art.

In the related art, the scrambling sequence is generated in accordance with the constant time-domain information. To be specific, the binary number $c_{init}$ for initializing the scrambling sequence is usually calculated through a formula $c_{init}=\lfloor n_s/2 \rfloor 2^9 + N_{ID}^{cell}$ [20], and then the scrambling sequence is generated using $c_{init}$ acquired through calculation, where $c_{init}$ represents the binary number for initializing the scrambling sequence, $n_s$ represents an index of a constant subframe for the transmission of the DCI in the LTE system (i.e., the constant time-domain information), N represents a cell N, and $N_{ID}^{cell}$ represents a PCI of the cell $N_{ID}^{cell}$.

The above-mentioned scrambling sequence initialization mode may be applied to the data transmission and reception at the LFB. In a scenario where the data transmission and reception is performed at the UFB, the transmission time point and the length of the radio frame change dynamically, so it is impossible to predict the subframe/slot for the transmission of the DCI, i.e., $n_s$. In this regard, before the PDCCH is in the idle state through the LBT detection, it is impossible to initialize the scrambling sequence in advance. The scrambling sequence may be initialized merely after the PDCCH is in the idle state through the LBT detection, so there is a relatively large delay for the data transmission at the UFB.

In the first embodiment of the present disclosure, the scrambling sequence may be generated through the formula $c_{init}^{scramble}=(2^{16} \cdot n_{RNTI}+n_{ID}) \bmod 2^{31}$ or $c_{init}^{scramble}=2^{16} \cdot \lfloor n_{RNTI}/2 \rfloor + n_{ID}$, independent of the time-domain information about the PDCCH, so the scrambling sequence may be generated in advance. Once there is an available resource at the UFB through the LBT detection, a scrambling operation may be performed rapidly and then the DCI may be transmitted, i.e., it is unnecessary to generate the scrambling sequence when there is the available resource. As a result, it is able to reduce the delay for the data transmission at the UFB.

A person skilled in the art may make any modifications on the above calculation formulae independent of the time-domain information about the PDCCH, e.g., change some values in each formula. However, it should be appreciated that, any calculation formulae acquired through the modifications without any creative effect shall also fall within the scope of the present disclosure.

Second Embodiment

In this embodiment, it is presumed that a plurality of CORESETs has been configured by the network device for the UE to receive the PDCCH. In addition, the scrambling identifiers have been configured with respect to the plurality of CORESETs respectively. The scrambling identifiers configured for different CORESETs may be different from each other.

In the case that the scrambling identifier has been configured, the network device may generate the scrambling sequence as follows.

At first, the binary number $c_{init}^{scramble}$ for initializing the scrambling sequence may be calculated through a formula $c_{init}^{scramble}=(2^{16} \cdot n_{RNTI}+n_{ID}) \bmod 2^{31}$ [21]. The meanings of the parameters in this formula may refer to those mentioned hereinabove, and thus will not be particularly defined herein.

Alternatively, the binary number $c_{init}^{scramble}$ for initializing the scrambling sequence may be calculated through a formula $c_{init}^{scramble}=2^{16} \cdot \lfloor n_{RNTI}/2 \rfloor + n_{ID}$ [22]. The meanings of the parameters in this formula may be the same as those in the above formula, and thus will not be particularly defined herein.

The network device may initialize the Gold sequence for constructing the scrambling sequence for the PDCCH in accordance with $c_{init}^{scramble}$ acquired through calculation, so as to acquire the scrambling sequence for the PDCCH.

The network device may scramble the DCI using the acquired scrambling sequence for the PDCCH, so as to acquire the scrambled DCI. Then, the network device may transmit the scrambled DCI to the UE through the PDCCH.

A descrambling process performed by the UE will be described hereinafter.

Correspondingly, the UE may calculate the binary number $c_{init}^{scramble}$ for initializing the scrambling sequence through the above formula, and initialize the Gold sequence for constructing the scrambling sequence for the PDCCH in accordance with $c_{init}^{scramble}$ acquired through calculation, so as to acquire the scrambling sequence for the PDCCH.

The UE may descramble the scrambled DCI transmitted by the network device through the PDCCH using the scrambling sequence for the PDCCH, so as to acquire the DCI.

It should be appreciated that, in order to descramble the scrambled DCI accurately, the UE and the network device may use a same formula for calculating the binary number $c_{init}^{scramble}$.

In the second embodiment of the present disclosure, the scrambling sequence for the PDCCH may be generated in accordance with the scrambling identifier, and the scrambling identifiers configured for different CORESETs may be different from each other, so different scrambling sequences may be adopted for the transmission of the DCI through different CORESETs. As a result, it is able for the UE to determine the CORESET through which the PDCCH is received, thereby to perform the subsequent operation.

Third Embodiment

In this embodiment, it is presumed that one CORESET has been configured by the network device for the UE to receive the PDCCH, i.e., PDCCH 1. In addition, an RNTI associated with the PDCCH 1 is marked as RNTI 1.

In the case that the scrambling identifier has been configured, the network device may generate the scrambling sequence as follows.

At first, the binary number $c_{init}^{scramble}$ for initializing the scrambling sequence may be calculated through a formula $c_{init}^{scramble}=(2^{16} \cdot n_{RNTI}+n_{ID}) \bmod 2^{31}$ [23]. The meanings of the parameters in this formula may refer to those mentioned hereinabove, and thus will not be particularly defined herein.

Next, the network device may initialize a Gold sequence for constructing the PDCCH 1 in accordance with $c_{init}^{scramble}$ acquired through calculation, so as to acquire the scrambling sequence for the PDCCH 1.

Next, the network device may scramble the DCI to be transmitted to the UE through the PDCCH 1 using the scrambling sequence for the PDCCH 1, so as to acquire the scrambled DCI. Then, the network device may transmit the scrambled DCI to the UE through the PDCCH 1.

How to descramble the scrambled DCI by the UE will be described hereinafter.

At first, the UE may detect the PDCCH 1 in the CORESET for receiving the PDCCH 1 configured by the network device for the UE in a blind manner.

Here, it should be appreciated that, during the blind detection by the UE, there may exist several circumstances, i.e., a circumstance where the PDCCH 1 transmitted to the UE itself may be detected, a circumstance where a PDCCH 2 transmitted to the other UE may be detected, and a circumstance where a noise or gibberish from the network device may be detected as the PDCCH, which will be described hereinafter.

First circumstance: the UE may detect the PDCCH 1 transmitted to the UE itself.

In this circumstance, the UE may calculate $c_{init}^{scramble}$ in a same mode as that for calculating $c_{init}^{scramble}$ by the network side, i.e., through the formulae mentioned in the third embodiment. Then, the UE may generate the scrambling sequence in accordance with $c_{init}^{scramble}$ acquired through calculation.

The scrambling sequence generated by the UE may be the same as that for scrambling, by the network device, the DCI to be transmitted through the PDCCH, so the UE may successfully descramble the scrambled DCI received through the PDCCH 1 using the scrambling sequence generated by the UE itself.

When the DCI is data 1+Cycle Redundancy Check (CRC) 1 and the CRC 1 is scrambled using the RNTI associated with the PDCCH 1, the UE may, after successfully descrambling the scrambled DCI using the scrambling sequence generated by the UE itself, further perform CRC descrambling on a bit where the CRC 1 included in the descrambled DCI using the RNTI of the UE itself, so as to acquire an original CRC and then validate the CRC. When the CRC validation is successful, it means that the UE has received the information for the UE, and otherwise, it means that the UE fails to receive the information.

Second circumstance: the UE may detect the PDCCH 2 transmitted to the other UE, and the UE and the other UE may belong to a same cell.

When the DCI transmitted through the PDCCH 2 is data 2+CRC 2 and the CRC 2 is scrambled using the RNTI (RNTI 2) associated with the PDCCH 2, the network device and the UE may each generate the scrambling sequence using the conventional scrambling sequence generation mode. To be specific, they may each generate $c_{init}$ through a formula $c_{init}=\lfloor n_s/2 \rfloor 2^9 + N_{ID}^{cell}$ [24], and then generate an initial sequence in accordance with $c_{init}$.

Due to the influence caused by an air-interface noise, an error may probably occur for a part of the CRC 2 transmitted to the UE through the PDCCH 2. In this case, when the UE descrambles the CRC 2 in accordance with the RNTI of the UE itself (i.e., RNTI 1), such a result as "the CRC validation is successful" may probably be acquired. Further, the scrambling sequences for the DCI transmitted by the network device to the UE and the other UEs are generated on the basis of a same $N_{ID}^{cell}$, so the UE may descramble the DCI using the scrambling sequence to acquire the descrambled DCI that should have been transmitted to the other UEs. The false detection of the DCI may lead to an increase in a false alarm.

However, through the schemes in this embodiment, the network device may generate the scrambling sequence for the PDCCH 2 in accordance with the scrambling identifier and the RNTI 2 associated with the PDCCH 2, e.g., through the formula $c_{init}^{scramble}=(2^{16} \cdot n_{RNTI}+n_{ID}) \bmod 2^{31}$, and the UE may generate the scrambling sequence for the PDCCH 1 through the formula $c_{init}^{scramble}=(2^{16} \cdot n_{RNTI}+n_{ID}) \bmod 2^{31}$ in accordance with the scrambling identifier and the RNTI 1 associated with the PDCCH 1. The scrambling sequence generated by the UE for the PDCCH 1 may be different from the scrambling sequence for the PDCCH 2, so it is impossible for the UE to descramble the DCI transmitted through the PDCCH 2. At this time, even though the CRC 2 is descrambled by the UE in accordance with the RNTI 1 of the UE itself to acquire the result "the CRC validation is successful", it is still impossible for the UE, using the scrambling sequence for the PDCCH 1, to descramble the DC scrambled using the scrambling sequence for the PDCCH 2. As a result, it is able for the UE to determine that the DCI is not transmitted to the UE itself.

Hence, as compared with related art, through the schemes in this embodiment, it is able to prevent the occurrence of the false detection of the DCI, thereby to prevent the false alarm from increasing.

Third circumstance: the UE may detect the noise or gibberish from the network device as the PDCCH.

In the third circumstance, the network device may not scramble the noise or gibberish. In addition, in some conventional technologies, the network device may merely scramble the CRC using the RNTI, rather than scrambling the DCI including the data and the CRC as a whole. Correspondingly, in the related art, the UE may merely descramble the CRC using the RNTI.

Upon the receipt of the noise or gibberish that has not been scrambled, when last 16 bits in the nose or gibberish (i.e., the bits where the CRC is located by default) is descrambled by the UE using the RNTI in accordance with the above conventional technology, a result indicating that the CRC validation is successful may be acquired by the UE due to the air-interface noise.

However, through the schemes in this embodiment of the present disclosure, the network device may not only scramble the CRC using the RNTI but also scramble the DCI including the data and the CRC as a whole using the scrambling sequence, i.e., a double scrambling mode may be adopted. Hence, upon the receipt of the noise or gibberish, the UE may generate the scrambling sequence to descramble the noise or gibberish as a whole. When the noise or gibberish is descrambled successfully, the UE may further descramble the CRC using the RNTI.

According to the third embodiment of the present disclosure, upon the receipt of the noise or gibberish, the UE may descramble the noise or gibberish as a whole using the scrambling sequence. Usually, the noise or gibberish is not subjected to any scrambling operation, and the CRC validation on a descrambling result acquired by the UE using the scrambling sequence may not be performed successfully, so it is able to remarkably reduce the probability of false detection.

In addition, it should be appreciated that, in the related art, the DCI is not scrambled as a whole, and instead, merely the CRC is scrambled. In addition, the scrambled CRC is located at the last 16 bits of the DCI. Hence, when descrambling the CRC, the UE needs to decode the entire DCI so as to determine whether the CRC validation on the DCI is successful, resulting in a relatively large reception delay.

However, through the schemes in this embodiment, the scrambling sequence may be generated in accordance with the Gold sequence, and a length of the scrambling sequence may be the same as that of the DCI. Hence, the information about the RNTI for the CRC located at the last 16 bits of the scrambled DCI may have a same length as the DCI, rather than being located at the last 16 bits of the DCI. For example, the information about the RNTI may have number M of bits, i.e., identical to the total number M of bits of the DCI. In this way, it is able to achieve such an effect that the information about the RNTI has number M of bits.

Hence, when the scrambled DCI is descrambled by the UE using an erroneous scrambling sequence, the bits where a descrambling error occurs may be moved to positions before the last 16 bits, rather than the last 16 bits in the related art. Once the descrambling error has been detected, the UE may terminate the decoding process before the entire DCI has been decoded. As a result, as compared with the related art where whether the CRC validation is successful is determined merely after the entire DCI has been decoded, through the double scrambling mode in this embodiment, it is able to reduce the reception delay.

Fourth Embodiment

In this embodiment, it is presumed that one CORESET has been configured by the network device for a UE (i.e., UE 1) to receive the PDCCH (i.e., PDCCH 1). In addition, an RNTI associated with the PDCCH 1 may be marked as RNTI 1.

In the case that the scrambling identifier has been configured, the network device may generate the scrambling sequence as follows.

At first, the binary number $c_{init}^{scramble}$ for initializing the scrambling sequence may be calculated through a formula $c_{init}^{scramble}=(2^{16} \cdot n_{RNTI}+n_{ID}) \bmod 2^{31}$ [25]. The meanings of the parameters in the formula may refer to those mentioned hereinabove, and thus will not be particularly defined herein.

Next, the network device may initialize the Gold sequence for constructing a scrambling sequence for the PDCCH 1 in accordance with $c_{init}^{scramble}$ acquired through calculation, so as to acquire the scrambling sequence for the PDCCH 1. Then, the network device may scramble DCI (i.e., DCI 1) using the scrambling sequence for the PDCCH 1, and transmit the scrambled DCI 1 to the UE 1.

It is presumed that the CORESET configured by the network device for the UE 1 includes, apart from the PDCCH 1, the other PDCCHs (e.g., a PDCCH 2) for transmitting DCI (i.e., DCI 2 including data 2+CRC 2) to another UE (i.e., UE 2), and the scrambling sequence for the PDCCH 2 is generated through the above formula in accordance with the scrambling identifier and the RNTI 2.

At this time, during the blind detection of the PDCCH 1 in the CORESET, when the UE has received the PDCCH 1 for the UE itself, the UE may generate the scrambling sequence for the PDCCH 1 through the above formula in accordance with the scrambling identifier and the RNTI 1, so as to descramble the scrambled DCI 1 successfully.

The DMRS sequence for descrambling the scrambled DCI 1 may be generated in accordance with $c_{init}^{DMRS}$ calculated through the formula $c_{init}^{DMRS}=n_{ID}$.

The UE 1 may perform the CRC validation on the DCI 1 acquired through descrambling, and when the CRC validation on the data in the DCI 1 is successful, the entire reception may be completed.

When the blind detection is performed by the UE 1 on the PDCCH 2 for the UE 2, the RNTI 1 of the UE 1 may be different from the RNTI 2 of the UE 2, so the scrambling sequence generated by the UE 1 may be different from the scrambling sequence for scrambling the DCI 2. Hence, it is impossible for the UE 1 to descramble the scrambled DCI 2 successfully, and the entire reception may fail.

It should be appreciated that, in the related art, the DCI is not scrambled as a whole, and instead, merely the CRC is scrambled. In addition, the scrambled CRC is located at the last 16 bits of the DCI. Hence, when descrambling the CRC, the UE needs to decode the entire DCI so as to determine whether the CRC validation on the DCI is successful, resulting in a relatively large reception delay.

However, through the schemes in this embodiment, the scrambling sequence may be generated in accordance with the Gold sequence, and a length of the scrambling sequence may be the same as that of the DCI. Hence, the information about the RNTI for the CRC located at the last 16 bits of the scrambled DCI may have a same length as the DCI, rather than being located at the last 16 bits of the DCI. For example, the information about the RNTI may have number M of bits, i.e., identical to the total number M of bits of the DCI. In this way, it is able to achieve such an effect that the information about the RNTI has number M of bits.

Hence, when the scrambled DCI is descrambled by the UE using an erroneous scrambling sequence, the bits where a descrambling error occurs may be moved to positions before the last 16 bits, rather than the last 16 bits in the related art. Once the descrambling error has been detected, the UE may terminate the decoding process before the entire DCI has been decoded. As a result, as compared with the related art where whether the CRC validation is successful is determined merely after the entire DCI has been decoded, through the double scrambling mode in this embodiment, it is able to reduce the reception delay.

Figure 5:
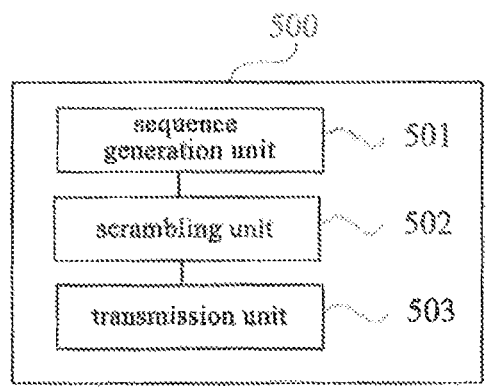
FIG. 5 is a schematic view showing a network device according to some embodiments of the present disclosure.

The present disclosure further provides in some embodiments a network device 500 which, as shown in FIG. 5, includes: a sequence generation unit 501 configured to generate a scrambling sequence in accordance with one or more first parameters, the one or more first parameters being determined in accordance with a predefined applied scenario and/or high-layer indication information; a scrambling unit 502 configured to scramble DCI using the generated scrambling sequence; and a transmission unit 503 configured to transmit the scrambled DCI to a UE.

In a possible embodiment of the present disclosure, the one or more first parameters may include an RNTI.

In a possible embodiment of the present disclosure, when a scrambling identifier has been configured, the one or more first parameters may further include the scrambling identifier.

In a possible embodiment of the present disclosure, the sequence generation unit 501 is further configured to: calculate $c_{init}^{scramble}$ through one of:

$$c_{init}^{scramble}=(2^{16} \cdot n_{RNTI}+n_{ID}) \bmod 2^{31} \quad [26]; \text{ and}$$

$$c_{init}^{scramble}=2^{16} \cdot \lfloor n_{RNTI}/2 \rfloor + n_{ID} \quad [27]$$

and generate the scrambling sequence in accordance with $c_{init}^{scramble}$ acquired through calculation, where $c_{init}^{scramble}$ represents a binary number for initializing the scrambling sequence, $n_{RNTI}$ represents the RNTI, and $n_{ID}$ represents the scrambling identifier.

In a possible embodiment of the present disclosure, the one or more first parameters may further include at least one of an identifier of a CORESET where a PUCCH is located, an identifier of a search space where the DCI is located, an index of a slot for the transmission of the DCI within a radio frame or radio subframe, and an index of an OFDM symbol for the transmission of the DCI.

In a possible embodiment of the present disclosure, when the one or more first parameters include the identifier of the CORESET, the sequence generation unit 501 is further configured to: calculate $c_{init}^{scramble}$ through a formula $c_{init}^{scramble}=(2^{16}*n_{RNTI}+n_{ID}^{CORESET}+n_{ID}) \bmod 2^{31}$ [28]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{CORESET}$ represents the identifier of the CORESET, and $n_{ID}$ represents the scrambling identifier.

In a possible embodiment of the present disclosure, when the one or more first parameters include the identifier of the search space, the sequence generation unit 501 is further configured to: calculate $c_{init}^{scramble}$ through a formula $c_{init}^{scramble}=(2^{16}*n_{RNTI}+n_{ID}^{SS}+n_{ID}) \bmod 2^{31}$ [29]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{SS}$ represents the identifier of the search space, and $n_{ID}$ represents the scrambling identifier.

In a possible embodiment of the present disclosure, when the one or more first parameters include the index of the slot within the radio frame or radio subframe and the index of the OFDM symbol, the sequence generation unit 501 is further configured to: calculate $c_{init}^{scramble}$ through a formula $c_{init}^{scramble}=(2^{16}*n_{RNTI}+14n_s+l+1+n_{ID}) \bmod 2^{31}$ [30]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_s$ represents the index of the slot within the radio frame or radio subframe, l represents the index of the OFDM, and $n_{ID}$ represents the scrambling identifier.

In a possible embodiment of the present disclosure, the one or more first parameters may further include time-domain information about the DCI and a PCI of a cell where the UE is located.

In a possible embodiment of the present disclosure, the sequence generation unit 501 is further configured to: calculate $c_{init}^{scramble}$ through a formula $c_{init}^{scramble}=(2^{10} \cdot n_{RNTI} \cdot (14n_s+l+1)+N_{ID}^{Cell}) \bmod 2^{31}$ [31]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_s$ represents the index of the slot for the transmission of the DCI within the radio frame or radio subframe, l represents the index of the OFDM symbol for the transmission of the DCI, and $N_{ID}^{cell}$ represents the PCI.

In a possible embodiment of the present disclosure, the sequence generation unit 501 is further configured to generate a DMRS sequence in accordance with one or more second parameters, the one or more second parameters may be determined in accordance with the predefined applied scenario and/or high-layer indication information. The transmission unit 503 is further configured to transmit data to the UE using the DMRS sequence.

In a possible embodiment of the present disclosure, when the scrambling identifier has been configured, the one or more second parameters may include the scrambling identifier.

In a possible embodiment of the present disclosure, the sequence generation unit 501 is further configured to: calculate $c_{init}^{DMRS}$ through a formula $c_{init}^{DMRS}=n_{ID}$ [32], where $c_{init}^{DMRS}$ represents a binary number for initializing the DMRS sequence, and $n_{ID}$ represents the scrambling identifier, and generate the DMRS sequence in accordance with $c_{init}^{DMRS}$ acquired through calculation.

In a possible embodiment of the present disclosure, the one or more second parameters may further include at least one of an identifier of a CORESET where a PUCCH is located, an identifier of a search space where the DCI is located, an index of a slot for the transmission of the DCI within a radio frame or radio subframe, and an index of an OFDM symbol for the transmission of the DCI.

In a possible embodiment of the present disclosure, when the one or more second parameters include the identifier of the CORESET, the sequence generation unit 501 is further configured to: calculate $c_{init}^{DMRS}$ through a formula $c_{init}^{DMRS}=2^{16}*n_{ID}^{CORESET}+n_{ID}$ [33]; and generate the DMRS sequence in accordance with $c_{init}^{DMRS}$ acquired through calculation, where $c_{init}^{DMRS}$ represents the binary number for initializing the DMRS sequence, $n_{ID}^{CORESET}$ represents the identifier of the CORESET, and $n_{ID}$ represents the scrambling identifier.

In a possible embodiment of the present disclosure, when the one or more second parameters include the identifier of the search space, the sequence generation unit 501 is further configured to: calculate $c_{init}^{DMRS}$ through a formula $c_{init}^{DMRS}=2^{16}*n_{ID}^{SS}+n_{ID}$ [34], where $c_{init}^{DMRS}$ represents the binary number for initializing the DMRS sequence, $n_{ID}^{SS}$ represents the index of the OFDM symbol, and $n_{ID}$ represents the scrambling identifier; and generate the DMRS sequence in accordance with $c_{init}^{DMRS}$ acquired through calculation.

In a possible embodiment of the present disclosure, when the one or more second parameters include the index of the slot and the index of the OFDM symbol, the sequence generation unit 501 is further configured to: calculate $c_{init}^{DMRS}$ through a formula $c_{init}^{DMRS}=2^{16}*(14n_s+l+1)+n_{ID}$ [35], where $c_{init}^{DMRS}$ represents the binary number for initializing the DMRS sequence, $n_{RNTI}$ represents the RNTI, $n_s$ represents the index of the slot, l represents the index of the OFDM symbol, and $n_{ID}$ represents the scrambling identifier; and generate the DMRS sequence in accordance with $c_{init}^{DMRS}$ acquired through calculation.

In a possible embodiment of the present disclosure, the one or more second parameters may further include the PCI and time-domain information about a DMRS.

In a possible embodiment of the present disclosure, the sequence generation unit 501 is further configured to: calculate $c_{init}^{DMRS}$ through a formula $c_{init}^{DMRS}=(14n_s+1+1)\cdot 2^{10}+N_{ID}^{Cell}$ [36]; and generate the DMRS sequence in accordance with $c_{init}^{DMRS}$ acquired through calculation, where $c_{init}^{DMRS}$ represents the binary number for initializing the DMRS sequence, $n_s$ represents the index of the slot for the transmission of the DCI within the radio frame or radio subframe, l represents the index of the OFDM symbol, and $n_{ID}^{cell}$ represents the PCI.

In a possible embodiment of the present disclosure, the transmission unit 503 is further configured to transmit the one or more second parameters to the UE.

In a possible embodiment of the present disclosure, the transmission unit 503 is further configured to transmit first parameter indication information for determining the one or more first parameters to the UE, and the first parameter indication information may be determined in accordance with the predefined applied scenario and/or the high-layer indication information.

In a possible embodiment of the present disclosure, the predefined applied scenario may include at least one of a scenario where the DCI to be transmitted at an LFB, a scenario where the DCI is to be transmitted at a UFB, a scenario where the one or more first parameters include the scrambling identifier, and a scenario where the one or more first parameters do not include the scrambling identifier. The high-layer indication information may include at least one of a frequency band license type, whether the scrambling identifier has been configured, at least one of the one or more first parameters when the scrambling identifier has been configured, and at least one of the one or more first parameters when the scrambling identifier has not been configured.

In a possible embodiment of the present disclosure, the one or more first parameters may meet at least one of the following configuration modes: a configuration mode where at least one of the one or more first parameters is configured through the high-layer indication information on the basis of a cell; a configuration mode where at least one of the one or more first parameters is configured through the high-layer indication information on the basis of a carrier; a configuration mode where at least one of the one or more first parameters is configured through the high-layer indication information on the basis of a bandwidth type; and a configuration mode where at least one of the one or more first parameters is configured through the high-layer indication information on the basis of a CORESET.

Figure 6:
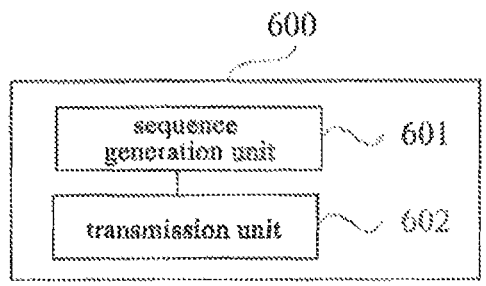
FIG. 6 is another schematic view showing the network device according to some embodiments of the present disclosure.

The present disclosure further provides in some embodiments a network device 600 which, as shown in FIG. 6, includes: a sequence generation unit 601 configured to generate a DMRS sequence in accordance with one or more second parameters, the one or more second parameters being determined in accordance with a predefined applied scenario and/or high-layer indication information; and a transmission unit 602 configured to transmit data to a UE using the DMRS sequence.

In a possible embodiment of the present disclosure, when a scrambling identifier has been configured, the one or more second parameters may include the scrambling identifier.

In a possible embodiment of the present disclosure, the sequence generation unit 601 is further configured to: calculate $c_{init}^{DMRS}$ through a formula $c_{init}^{DMRS}=n_{ID}$ [37], where $c_{init}^{DMRS}$ represents a binary number for initializing the DMRS sequence, and $n_{ID}$ represents the scrambling identifier.

In a possible embodiment of the present disclosure, the one or more second parameters may further include at least one of an identifier of a CORESET where a PUCCH is located, an identifier of a search space where the DCI is located, an index of a slot for the transmission of the DCI within a radio frame or radio subframe, and an index of an OFDM symbol for the transmission of the DCI.

In a possible embodiment of the present disclosure, when the one or more second parameters include the identifier of the CORESET, the sequence generation unit 601 is further configured to: calculate $c_{init}^{DMRS}$ through a formula $c_{init}^{DMRS}=2^{16}*n_{ID}^{CORESET}+n_{ID}$ [38]; and generate the DMRS sequence in accordance with $c_{init}^{DMRS}$ can acquired through calculation, where $c_{init}^{DMRS}$ represents the binary number for initializing the DMRS sequence, $n_{ID}^{CORESET}$ represents the identifier of the CORESET, and $n_{ID}$ represents the scrambling identifier.

In a possible embodiment of the present disclosure, when the one or more second parameters include the identifier of the search space, the sequence generation unit 601 is further configured to calculate $c_{init}^{DMRS}$ through a formula $c_{init}^{DMRS}=2^{16}*n_{ID}^{SS}+n_{ID}$ [39], where $c_{init}^{DMRS}$ represents the binary number for initializing the DMRS sequence, $n_{ID}^{SS}$ represents the index of the OFDM symbol, and $n_{ID}$ represents the scrambling identifier.

In a possible embodiment of the present disclosure, when the one or more second parameters include the index of the slot within the radio frame or radio subframe and the index of the OFDM symbol, the sequence generation unit 601 is further configured to calculate $c_{init}^{DMRS}$ through a formula $c_{init}^{DMRS}=2^{16}*(14n_s+l+1)+n_{ID}$ [40], where $c_{init}^{DMRS}$ represents the binary number for initializing the DMRS sequence, $n_{RNTI}$ represents the RNTI, $n_s$ represents the index of the slot, l represents the index of the OFDM symbol, and $n_{ID}$ represents the scrambling identifier.

In a possible embodiment of the present disclosure, the one or more second parameters may include a PCI and time-domain information about a DMRS.

In a possible embodiment of the present disclosure, the sequence generation unit 601 is further configured to: calculate $c_{init}^{DMRS}$ through a formula $c_{init}^{DMRS}=(14n_s+l+1)\cdot 2^{10}+N_{ID}^{Cell}$ [41]; and generate the DMRS sequence in accordance with $c_{init}^{DMRS}$ acquired through calculation, where $c_{init}^{DMRS}$ represents the binary number for initializing the DMRS sequence, $n_s$ represents the index of the slot for the transmission of the DCI within the radio frame or radio subframe, represents the index of the OFDM symbol, and $N_{ID}^{cell}$ represents the PCI.

In a possible embodiment of the present disclosure, the transmission unit 602 is further configured to transmit the one or more second parameters to the UE.

In a possible embodiment of the present disclosure, the predefined applied scenario may include at least one of a scenario where the DCI to be transmitted at an LFB, a scenario where the DCI is to be transmitted at a UFB, a scenario where the one or more first parameters include the scrambling identifier, and a scenario where the one or more first parameters do not include the scrambling identifier. The high-layer indication information may include at least one of a frequency band license type, whether the scrambling identifier has been configured, at least one of the one or more first parameters when the scrambling identifier has been configured, and at least one of the one or more first parameters when the scrambling identifier has not been configured.

Figure 7:
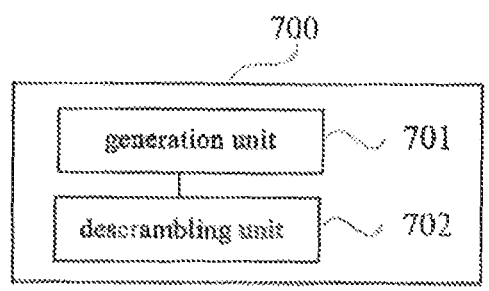
FIG. 7 is a schematic view showing a UE according to some embodiments of the present disclosure.

The present disclosure further provides in some embodiments a UE 700 which, as shown in FIG. 7, includes: a sequence generation unit 701 configured to generate a scrambling sequence in accordance with one or more first parameters, the one or more first parameters being determined in accordance with a predefined applied scenario or indication information from a network device; and a descrambling unit 702 configured to descramble scrambled DCI received from the network device using the generated scrambling sequence.

In a possible embodiment of the present disclosure, the one or more first parameters may include an RNTI.

In a possible embodiment of the present disclosure, when a scrambling identifier has been configured, the one or more first parameters may further include the scrambling identifier.

In a possible embodiment of the present disclosure, the sequence generation unit 701 is further configured to: calculate $c_{init}^{scramble}$ through one of $c_{init}^{scramble}=(2^{16} \cdot n_{RNTI}+n_{ID}) \bmod 2^{31}$ [42] and $c_{init}^{scramble}=2^{16} \cdot \lfloor n_{RNTI}/2 \rfloor + n_{ID}$ [43]; and generate the scrambling sequence in accordance with $c_{init}^{scramble}$ acquired through calculation, where $c_{init}^{scramble}$ represents a binary number for initializing the scrambling sequence, $n_{RNTI}$ represents the RNTI, and $n_{ID}$ represents the scrambling identifier.

In a possible embodiment of the present disclosure, the one or more first parameters may further include at least one of an identifier of a CORESET where a PUCCH is located, an identifier of a search space where the DCI is located, an index of a slot for the transmission of the DCI within a radio frame or radio subframe, and an index of an OFDM symbol for the transmission of the DCI.

In a possible embodiment of the present disclosure, when the one or more first parameters include the identifier of the CORESET, the sequence generation unit 701 is further configured to: calculate $c_{init}^{scramble}$ through a formula $c_{init}^{scramble}=(2^{16}*n_{RNTI}+n_{ID}^{CORESET}+n_{ID}) \bmod 2^{31}$ [44]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{CORESET}$ represents the identifier of the CORESET, and $n_{ID}$ represents the scrambling identifier.

In a possible embodiment of the present disclosure, when the one or more first parameters include the identifier of the search space, the sequence generation unit 701 is further configured to: calculate $c_{init}^{scramble}$ through a formula $c_{init}^{scramble}=(2^{16}*n_{RNTI}+n_{ID}^{SS}+n_{ID}) \bmod 2^{31}$ [45]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{SS}$ represents the identifier of the search space, and $n_{ID}$ represents the scrambling identifier.

In a possible embodiment of the present disclosure, when the one or more first parameters include the index of the slot within the radio frame or radio subframe and the index of the OFDM symbol, the sequence generation unit 701 is further configured to: calculate $c_{init}^{scramble}$ through a formula $c_{init}^{scramble}=(2^{16}*n_{RNTI}+14n_s+l+1+n_{ID}) \bmod 2^{31}$ [46]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_s$ represents the index of the slot within the radio frame or radio subframe, l represents the index of the OFDM, and $n_{ID}$ represents the scrambling identifier.

In a possible embodiment of the present disclosure, the one or more first parameters may further include time-domain information about the DCI and a PCI of a cell where the UE is located.

In a possible embodiment of the present disclosure, the sequence generation unit 701 is further configured to: calculate $c_{init}^{scramble}$ through a formula $c_{init}^{scramble}=(2^{10} \cdot n_{RNTI} \cdot (14n_s+l+1)+N_{ID}^{Cell}) \bmod 2^{31}$ [47]; and generate the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_s$ represents the index of the slot for the transmission of the DCI within the radio frame or radio subframe, l represents the index of the OFDM symbol for the transmission of the DCI, and $N_{ID}^{cell}$ represents the PCI.

In a possible embodiment of the present disclosure, the sequence generation unit 701 is further configured to generate a DMRS sequence in accordance with one or more second parameters, the one or more second parameters may be determined in accordance with the predefined applied scenario and/or high-layer indication information. The descrambling unit is further configured to demodulate a received data signal using the DMRS sequence, so as to acquire the scrambled DCI.

In a possible embodiment of the present disclosure, when the scrambling identifier has been configured, the one or more second parameters may include the scrambling identifier.

In a possible embodiment of the present disclosure, the sequence generation unit 701 is further configured to: calculate $c_{init}^{DMRS}$ through a formula $c_{init}^{DMRS}=n_{ID}$ [48], where $c_{init}^{DMRS}$ represents a binary number for initializing the DMRS sequence, and nm represents the scrambling identifier.

In a possible embodiment of the present disclosure, the one or more second parameters may further include at least one of an identifier of a CORESET where a PUCCH is located, an identifier of a search space where the DCI is located, an index of a slot for the transmission of the DCI within a radio frame or radio subframe, and an index of an OFDM symbol for the transmission of the DCI.

In a possible embodiment of the present disclosure, when the one or more second parameters include the identifier of the CORESET, the sequence generation unit 701 is further configured to: calculate $c_{init}^{DMRS}$ through a formula $c_{init}^{DMRS}=2^{16}*n_{ID}^{CORESET}+n_{ID}$ [49]; and generate the DMRS sequence in accordance with $c_{init}^{DMRS}$ acquired through calculation, where $c_{init}^{DMRS}$ represents the binary number for initializing the DMRS sequence, $n_{ID}^{CORESET}$ represents the identifier of the CORESET, and $n_{ID}$ represents the scrambling identifier.

In a possible embodiment of the present disclosure, when the one or more second parameters include the identifier of the search space, the sequence generation unit 701 is further configured to: calculate $c_{init}^{DMRS}$ through a formula $c_{init}^{DMRS}=2^{16}*n_{ID}^{SS}+n_{ID}$ [50], where $c_{init}^{DMRS}$ represents the binary number for initializing the DMRS sequence, $n_{ID}^{SS}$ represents the index of the OFDM symbol, and $n_{ID}$ represents the scrambling identifier.

In a possible embodiment of the present disclosure, when the one or more second parameters include the index of the slot and the index of the OFDM symbol, the sequence generation unit 701 is further configured to: calculate $c_{init}^{DMRS}$ through a formula $c_{init}^{DMRS}=2^{16}*(14n_s+l+1)+n_{ID}$ [51], where $c_{init}^{DMRS}$ represents the binary number for initializing the DMRS sequence, $n_{RNTI}$ represents the RNTI, $n_s$ represents the index of the slot, l represents the index of the OFDM symbol, and $n_{ID}$ represents the scrambling identifier.

In a possible embodiment of the present disclosure, the one or more second parameters may further include the PCI and time-domain information about a DMRS.

In a possible embodiment of the present disclosure, the sequence generation unit 701 is further configured to: calculate $c_{init}^{DMRS}$ through a formula $c_{init}^{DMRS}=(14n_s+l+1)\cdot 2^{10}+N_{ID}^{Cell}$ [52]; and generate the DMRS sequence in accordance with $c_{init}^{DMRS}$ acquired through calculation, where $c_{init}^{DMRS}$ represents the binary number for initializing the DMRS sequence, $n_s$ represents the index of the slot for the transmission of the DCI within the radio frame or radio subframe, l represents the index of the OFDM symbol, and $N_{ID}^{cell}$ represents the PCI.

In a possible embodiment of the present disclosure, when the one or more first parameters are determined in accordance with the indication information from the network device, the UE may further include a reception unit configured to receive indication information including the one or more second parameters from the network device.

In a possible embodiment of the present disclosure, the predefined applied scenario may include at least one of a scenario where the DCI to be transmitted at an LFB, a scenario where the DCI is to be transmitted at a UFB, a scenario where the one or more first parameters include the scrambling identifier, and a scenario where the one or more first parameters do not include the scrambling identifier.

In a possible embodiment of the present disclosure, the one or more first parameters may meet at least one of the following configuration modes: a configuration mode where at least one of the one or more first parameters is configured through the high-layer indication information on the basis of a cell; a configuration mode where at least one of the one or more first parameters is configured through the high-layer indication information on the basis of a carrier; a configuration mode where at least one of the one or more first parameters is configured through the high-layer indication information on the basis of a bandwidth type; and a configuration mode where at least one of the one or more first parameters is configured through the high-layer indication information on the basis of a CORESET.

Figure 8:
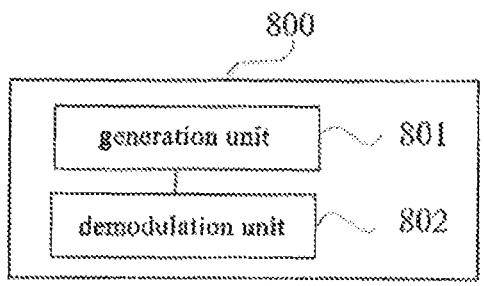
FIG. 8 is another schematic view showing the UE according to some embodiments of the present disclosure.

The present disclosure further provides in some embodiments a UE 800 which, as shown in FIG. 8, includes: a sequence generation unit 801 configured to generate a DMRS sequence in accordance with one or more second parameters, the one or more second parameters being determined in accordance with a predefined applied scenario or indication information from a network device; and a demodulation unit 802 configured to demodulate a received data signal using the DMRS sequence, so as to acquire scrambled DCI.

In a possible embodiment of the present disclosure, when a scrambling identifier has been configured, the one or more second parameters may include the scrambling identifier.

In a possible embodiment of the present disclosure, the sequence generation unit 801 is further configured to: calculate $c_{init}^{DMRS}$ through a formula $c_{init}^{DMRS}=n_{ID}$ [53], where $c_{init}^{DMRS}$ represents a binary number for initializing the DMRS sequence, and $n_{ID}$ represents the scrambling identifier.

In a possible embodiment of the present disclosure, the one or more second parameters may further include at least one of an identifier of a CORESET where a PUCCH is located, an identifier of a search space where the DC is located, an index of a slot for the transmission of the DCI within a radio frame or radio subframe, and an index of an OFDM symbol for the transmission of the DCI.

In a possible embodiment of the present disclosure, when the one or more second parameters include the identifier of the CORESET, the sequence generation unit 801 is further configured to: calculate $c_{init}^{DMRS}$ through a formula $c_{init}^{DMRS}=2^{16}*n_{ID}^{CORESET}+n_{ID}$ [54]; and generate the DMRS sequence in accordance with $c_{init}^{DMRS}$ acquired through calculation, where $c_{init}^{DMRS}$ represents the binary number for initializing the DMRS sequence, $n_{ID}^{CORESET}$ represents the identifier of the CORESET, and $n_{ID}$ represents the scrambling identifier.

In a possible embodiment of the present disclosure, when the one or more second parameters include the identifier of the search space, the sequence generation unit 801 is further configured to calculate $c_{init}^{DMRS}$ through a formula $c_{init}^{DMRS}=2^{16}*n_{ID}^{SS}+n_{ID}$ [55], where $c_{init}^{DMRS}$ represents the binary number for initializing the DMRS sequence, $n_{ID}^{SS}$ represents the index of the OFDM symbol, and $n_{ID}$ represents the scrambling identifier.

In a possible embodiment of the present disclosure, when the one or more second parameters include the index of the slot within the radio frame or radio subframe and the index of the OFDM symbol, the sequence generation unit 801 is further configured to calculate $c_{init}^{DMRS}$ through a formula $c_{init}^{DMRS}=2^{16}*(14n_s+l+1)+n_{ID}$ [56], where $c_{init}^{DMRS}$ represents the binary number for initializing the DMRS sequence, $n_{RNTI}$ represents the RNTI, $n_s$ represents the index of the slot, l represents the index of the OFDM symbol, and $n_{ID}$ represents the scrambling identifier.

In a possible embodiment of the present disclosure, the one or more second parameters may include a PCI and time-domain information about a DMRS.

In a possible embodiment of the present disclosure, the sequence DMRS generation unit 801 is further configured to: calculate $c_{init}^{DMRS}$ through a formula $c_{init}^{DMRS}=(14n_s+l+1)\cdot 2^{10}+N_{ID}^{Cell}$ [57]; and generate the DMRS sequence in accordance with $c_{init}^{DMRS}$ acquired through calculation, where $c_{init}^{DMRS}$ represents the binary number for initializing the DMRS sequence, $n_s$ represents the index of the slot for the transmission of the DCI within the radio frame or radio subframe, l represents the index of the OFDM symbol, and $N_{ID}^{cell}$ represents the PCI.

In a possible embodiment of the present disclosure, when the one or more second parameters are determined in accordance with the indication information from the network device, the UE 800 may further include a reception unit configured to, before the sequence generation unit 801 has generated the DMRS sequence in accordance with the one or more second parameters, receive the indication information including the one or more second parameters from the network device.

In a possible embodiment of the present disclosure, the predefined applied scenario may include at least one of a scenario where the DCI to be transmitted at an LFB, a scenario where the DCI is to be transmitted at a UFB, a scenario where the one or more first parameters include the scrambling identifier, and a scenario where the one or more first parameters do not include the scrambling identifier.

Figure 9:
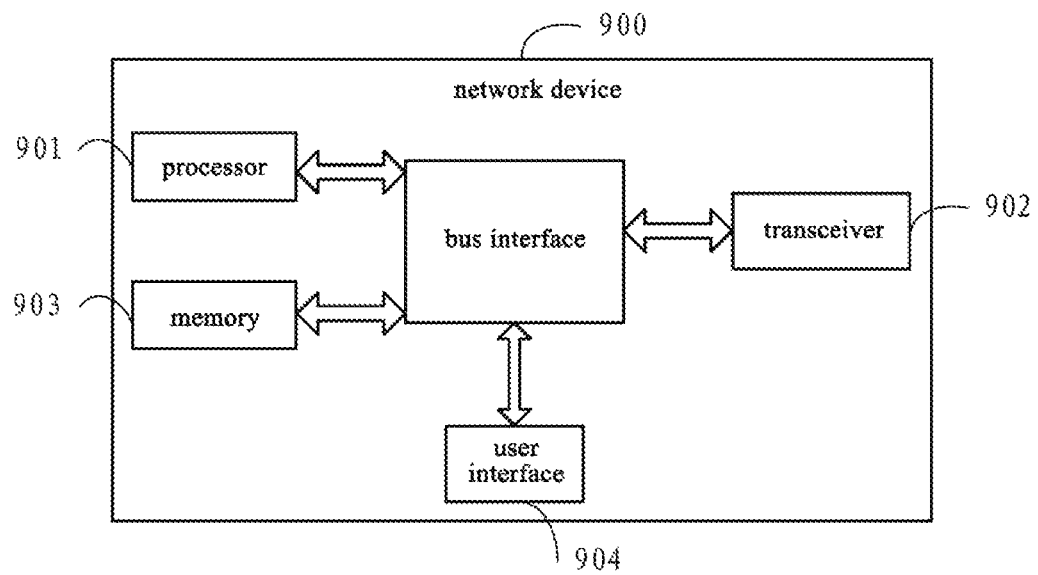
FIG. 9 is yet another schematic view showing the network device according to some embodiments of the present disclosure.

The present disclosure further provides in some embodiments a network device capable of implementing the method in FIG. 2 with a same technical effect. As shown in FIG. 9, the network device 900 may include a processor 901, a transceiver 902, a memory 903, a user interface 904 and a bus interface.

In the embodiments of the present disclosure, the network device 900 may further include a computer program stored in the memory 903 and executed by the processor 901. The processor 901 is configured to execute the computer program so as to: generate a scrambling sequence in accordance with one or more first parameters, the one or more first parameters being determined in accordance with a pre-defined applied scenario and/or high-layer indication information; scramble DCI using the generated scrambling sequence; and transmit the scrambled DCI to a UE.

In FIG. 9, bus architecture may include a number of buses and bridges connected to each other, so as to connect various circuits for one or more processors 901 and one or more memories 903. In addition, as is known in the art, the bus architecture may be used to connect any other circuits, such as a circuit for a peripheral device, a circuit for a voltage stabilizer and a power management circuit. The bus interface may be provided, and the transceiver 902 may consist of a plurality of elements, i.e., a transmitter and a receiver for communication with any other devices over a transmission medium. With respect to different UEs, the user interface 904 may also be provided for devices which are to be arranged inside or outside the UE, and these devices may include but not limited to a keypad, a display, a speaker, a microphone and a joystick. The processor 901 may take charge of managing the bus architecture as well as general processings. The memory 903 may store therein data for the operation of the processor 901.

The network device 900 is also capable of implementing the procedures that have been implemented by the network device in FIG. 2, which will not be particularly defined herein.

The present disclosure further provides in some embodiments a computer-readable storage medium storing therein a computer program. The computer program is executed by a processor so as to implement the method in FIG. 2 with a same technical effect, which will not be particularly defined herein. The computer-readable storage medium may be a Read-Only Memory (ROM), a Random Access Memory (RAM), a magnetic disk or an optical disk.

Figure 10:
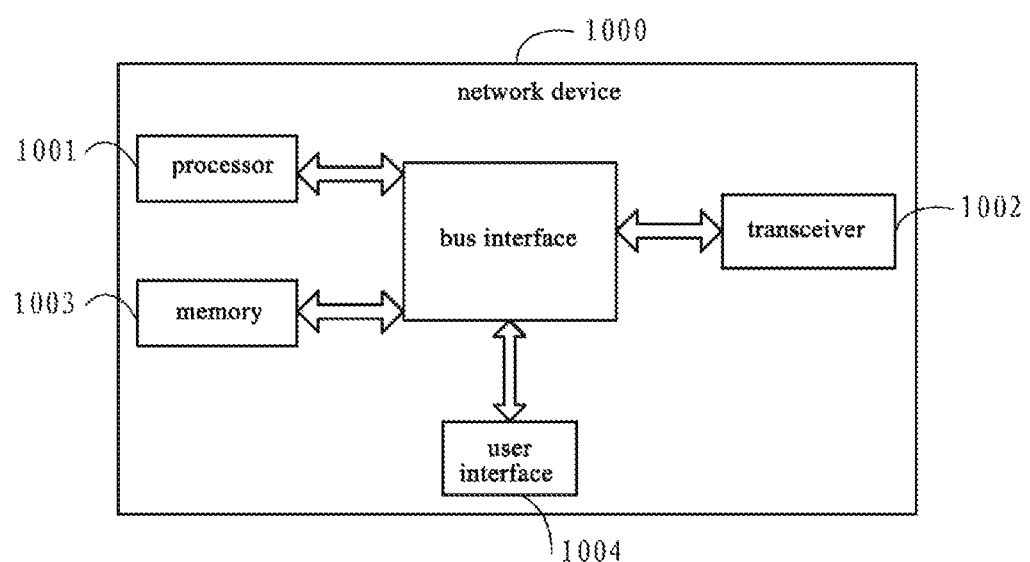
FIG. 10 still yet another schematic view showing the network device according to some embodiments of the present disclosure.

The present disclosure further provides in some embodiments a network device capable of implementing the method in FIG. 2 with a same technical effect. As shown in FIG. 10, the network device 1000 may include a processor 1001, a transceiver 1002, a memory 1003, a user interface 1004 and a bus interface.

In the embodiments of the present disclosure, the network device 1000 may further include a computer program stored in the memory 1003 and executed by the processor 1001. The processor 1001 is configured to execute the computer program so as to: generate a DMRS sequence in accordance with one or more second parameters, the one or more second parameters being determined in accordance with a pre-defined applied scenario and/or high-layer indication information; and transmit data to a UE using the DMRS sequence.

In FIG. 10, bus architecture may include a number of buses and bridges connected to each other, so as to connect various circuits for one or more processors 1001 and one or more memories 1003. In addition, as is known in the art, the bus architecture may be used to connect any other circuits, such as a circuit for a peripheral device, a circuit for a voltage stabilizer and a power management circuit. The bus interface may be provided, and the transceiver 1002 may consist of a plurality of elements, i.e., a transmitter and a receiver for communication with any other devices over a transmission medium. With respect to different UEs, the user interface 1004 may also be provided for devices which are to be arranged inside or outside the UE, and these devices may include but not limited to a keypad, a display, a speaker, a microphone and a joystick. The processor 1001 may take charge of managing the bus architecture as well as general processings. The memory 1003 may store therein data for the operation of the processor 1001.

The network device 1000 is also capable of implementing the procedures that have been implemented by the network device in FIG. 2, which will not be particularly defined herein.

The present disclosure further provides in some embodiments a computer-readable storage medium storing therein a computer program. The computer program is executed by a processor so as to implement the method in FIG. 2 with a same technical effect, which will not be particularly defined herein. The computer-readable storage medium may be an ROM, an RAM, a magnetic disk or an optical disk.

Figure 11:
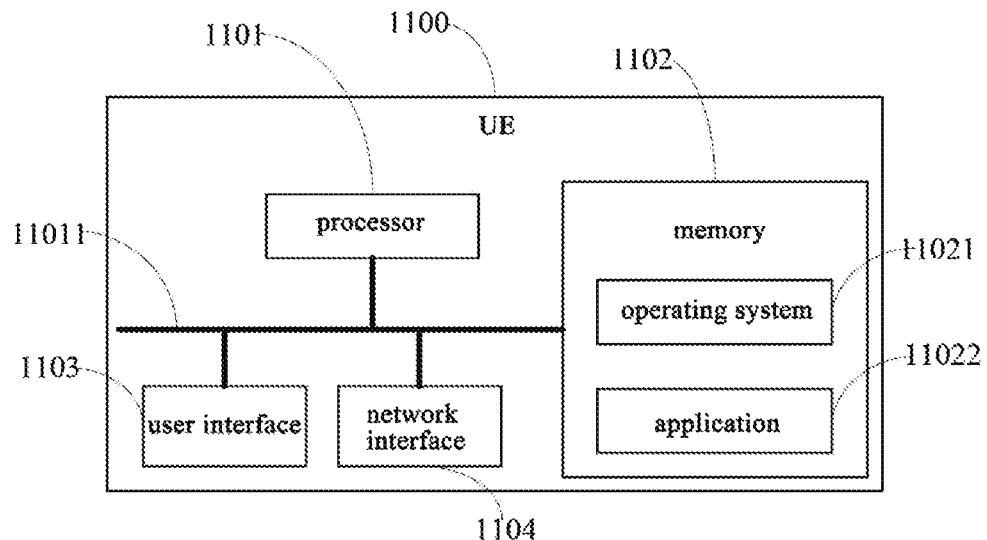
FIG. 11 is yet another schematic view showing the UE according to some embodiments of the present disclosure.

The present disclosure further provides in some embodiments a UE 1100 which, as shown in FIG. 11, includes at least one processor 1101, a memory 1102, at least one network interface 1104 and a user interface 1103. The components of the UE 1100 may be coupled together through a bus system 11011. It should be appreciated that, the bus system 11011 is configured to achieve connection and communication among the components. Apart from a data bus, the bus system 11011 may further include a power source bus, a control bus and a state signal bus. For clarification, all these buses in FIG. 11 may be collectively called as bus system 11011.

The user interface 1103 may include a display, a keyboard or a pointing device (e.g., mouse, track ball, touch plate or touch panel).

It should be appreciated that, the memory 1102 may be a volatile memory, a nonvolatile memory or both. The non-volatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1102 intends to include, but not limited to, the above-mentioned and any other appropriate memories.

In a possible embodiment of the present disclosure, the following elements may be stored in the memory 1102: an executable module or data structure, a subset or an extended set thereof, an operating system 11021 and an application 11022.

The operating system 11021 may include various system programs, e.g., a framework layer, a core layer and a driving layer, so as to implement various basic services and process hardware-based tasks. The application 11022 may include various applications, e.g., Media Player and Browser, so as to implement various application services. The programs for implementing the above-mentioned method may be included in the application 11022.

In the embodiments of the present disclosure, the UE 1100 may further include a computer program stored in the memory 1102 and executed by the processor 1101. The processor 1101 is configured to execute the computer program so as to: generate a scrambling sequence in accordance with one or more first parameters, the one or more first parameters being determined in accordance with a pre-defined applied scenario or indication information from a network device; and descramble scrambled DCI received from the network device using the generated scrambling sequence.

The above-mentioned method may be applied to, or implemented by, the processor 1101. The processor 1101 may be an integrated circuit (IC) having a signal processing capability. During the implementation, the steps of the above-mentioned method may be completed through an integrated logic circuit of hardware in the processor 1101 or instructions in the form of software. The processor 1101 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1102, and the processor 1101 may read information stored in the memory 1102 so as to implement the steps of the method in conjunction with the hardware. To be specific, a computer program may be stored in the computer-readable storage medium, and the computer program is executed by the processor 1101 so as to implement the steps of the method in FIG. 3.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The UE 1100 is also capable of implementing the procedures that have been implemented by the UE in FIG. 3, which will not be particularly defined herein.

The present disclosure further provides in some embodiments a UE, which includes a processor 1110, a memory 1102, and a computer program stored in the memory 1102 and executed by the processor 1110. The processor 1110 is configured to execute the computer program so as to implement the above-mentioned method in FIG. 3 with a same technical effect, which will not be particularly defined herein.

The present disclosure further provides in some embodiments a computer-readable storage medium storing therein a computer program. The computer program is executed by a processor so as to implement the above-mentioned method in FIG. 3 with a same technical effect, which will not be particularly defined herein. The computer-readable storage medium may be an ROM, an RAM, a magnetic disk or an optical disk.

Figure 12:
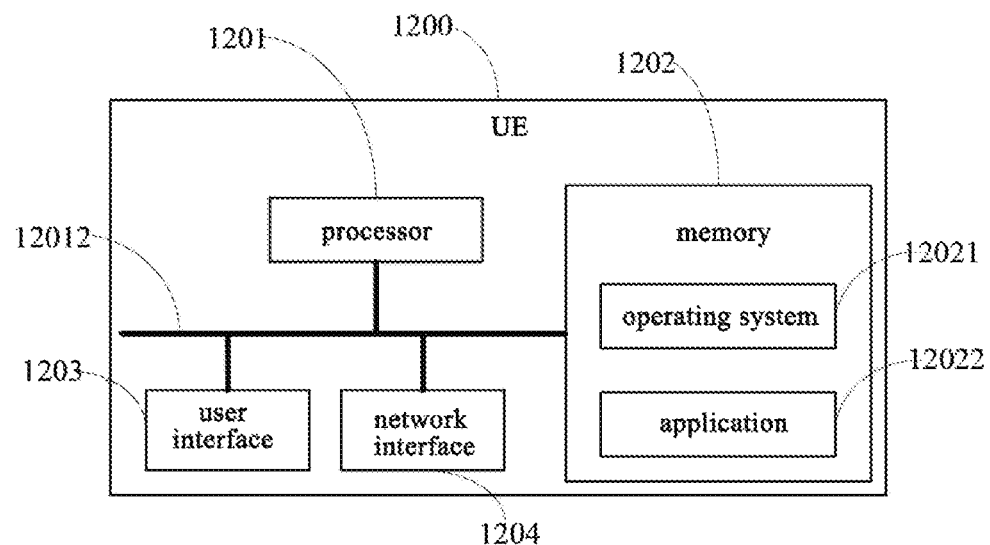
FIG. 12 is still yet another schematic view showing the UE according to some embodiments of the present disclosure.

The present disclosure further provides in some embodiments a UE 1100 which, as shown in FIG. 12, includes at least one processor 1101, a memory 1102, at least one network interface 1104 and a user interface 1003. The components of the UE 1100 may be coupled together through a bus system 11011. It should be appreciated that, the bus system 11011 is configured to achieve connection and communication among the components. Apart from a data bus, the bus system 11011 may further include a power source bus, a control bus and a state signal bus. For clarification, all these buses in FIG. 11 may be collectively called as bus system 11011.

The user interface 1103 may include a display, a keyboard or a pointing device (e.g., mouse, track ball, touch plate or touch panel).

It should be appreciated that, the memory 1102 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1102 intends to include, but not limited to, the above-mentioned and any other appropriate memories.

In a possible embodiment of the present disclosure, the following elements may be stored in the memory 1102: an executable module or data structure, a subset or an extended set thereof, an operating system 11021 and an application 11022.

The operating system 11021 may include various system programs, e.g., a framework layer, a core layer and a driving layer, so as to implement various basic services and process hardware-based tasks. The application 11022 may include various applications, e.g., Media Player and Browser, so as to implement various application services. The programs for implementing the above-mentioned method may be included in the application 11022.

In the embodiments of the present disclosure, the UE 1100 may further include a computer program stored in the memory 1102 and executed by the processor 1101. The processor 1101 is configured to execute the computer program so as to: generate a DMRS sequence in accordance with one or more second parameters, the one or more second parameters being determined in accordance with a predefined applied scenario or indication information from a network device; and demodulate a received data signal using the DMRS sequence, so as to acquire scrambled DCI.

The above-mentioned method may be applied to, or implemented by, the processor 1101. The processor 1101 may be an integrated circuit (IC) having a signal processing capability. During the implementation, the steps of the above-mentioned method may be completed through an integrated logic circuit of hardware in the processor 1101 or instructions in the form of software. The processor 1101 may be a general-purpose processor, a digital signal processor, an ASIC, an FPGA or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1102, and the processor 1101 may read information stored in the memory 1102 so as to implement the steps of the method in conjunction with the hardware. To be specific, a computer program may be stored in the computer-readable storage medium, and the processor 1101 is configured to execute the computer program so as to implement the steps of the method in FIG. 4.

It should be appreciated that, the embodiments of the present disclosure may be implemented by hardware, software, firmware, middleware, microcode or a combination thereof. For the hardware implementation, the processor may include one or more of an ASIC, a DSP, a DSPD, a PLD, an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The UE 1100 is also capable of implementing the procedures that have been implemented by the UE in FIG. 4, which will not be particularly defined herein.

The present disclosure further provides in some embodiments a UE, which includes a processor 1101, a memory 1102, and a computer program stored in the memory 1102 and executed by the processor 1101. The processor 1101 is configured to execute the computer program so as to implement the above-mentioned method in FIG. 4 with a same technical effect, which will not be particularly defined herein.

The present disclosure further provides in some embodiments a computer-readable storage medium storing therein a computer program. The computer program is executed by a processor so as to implement the above-mentioned method in FIG. 4 with a same technical effect, which will not be particularly defined herein. The computer-readable storage medium may be an ROM, an RAM, a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission method performed by a network device, comprising:
generating a scrambling sequence in accordance with one or more first parameters, the one or more first parameters being determined in accordance with a predefined applied scenario and/or high-layer indication information, wherein the one or more first parameters comprise a Radio Network Temporary Identity (RNTI);
scrambling Downlink Control Information (DCI) using the generated scrambling sequence; and
transmitting the scrambled DCI to a User Equipment (UE),
wherein when a scrambling identifier has been configured, the one or more first parameters further comprise the scrambling identifier,
wherein the generating the scrambling sequence in accordance with parameters comprises;

calculating $c_{init}^{scramble}$ through $c_{init}^{scramble} = (2^{16} \cdot n_{RNTI} + n_{ID}) \bmod 2^{31}$ or $c_{init}^{scramble} = 2^{16} \cdot \lfloor n_{RNTI}/2 \rfloor + n_{ID}$; and generating the scrambling sequence in accordance with $c_{init}^{scramble}$ acquired through calculation, where $c_{init}^{scramble}$ represents a binary number for initializing the scrambling sequence, $n_{RNTI}$ represents the RNTI, and $n_{ID}$ represents the scrambling identifier.

2. The data transmission method according to claim 1, wherein the one or more first parameters further comprise at least one of an identifier of a Control Resource Set (CORESET) where a Physical Uplink Control Channel (PUCCH) is located, an identifier of a search space where the DCI is located, an index of a slot for the transmission of the DCI within a radio frame or radio subframe, and an index of an Orthogonal Frequency Division Multiplexing (OFDM) symbol for the transmission of the DCI.

3. The data transmission method according to claim 2, wherein when the one or more first parameters comprise the identifier of the CORESET, the generating the scrambling sequence in accordance with the one or more first parameters comprises:

calculating $c_{init}^{scramble}$ through a formula $c_{init}^{scramble} = (2^{16} \cdot n_{RNTI} + n_{ID}^{CORSET} + n_{ID}) \bmod 2^{31}$; and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{CORESET}$ represents the identifier of the CORESET, and $n_{ID}$ represents the scrambling identifier.

4. The data transmission method according to claim 2, wherein when the one or more first parameters comprise the identifier of the search space, the generating the scrambling sequence in accordance with the one or more first parameters comprises:

calculating $c_{init}^{scramble}$ through a formula
$c_{init}^{scramble} = (2^{16} * n_{RNTI} + n_{ID}^{SS} + n_{ID}) \bmod 2^{31}$; and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{SS}$ represents the identifier of the search space, and $n_{ID}$ scrambling identifier.

5. The data transmission method according to claim 2, wherein when the one or more first parameters comprise the index of the slot within the radio frame or radio subframe and the index of the OFDM symbol, the generating the scrambling sequence in accordance with the one or more first parameters comprises;

calculating $c_{init}^{scramble}$ through a formula
$c_{init}^{scramble} = (2^{16} * n_{RNTI} + 14 n_s + l + 1 + n_{ID}) \bmod 2^{31}$;
and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_s$ represents the index of the slot within the radio frame or radio subframe, l represents the index of the OFDM, and $n_{ID}$ represents the scrambling identifier.

6. The data transmission method according to claim 1, further comprising:

generating a DeModuIation Reference Signal (DMRS) sequence in accordance with one or more second parameters, the one or more second parameters being determined in accordance with the predefined applied scenario and/or high-layer indication information, and transmitting data to the UE using the DMRS sequence, wherein when the scrambling identifier has been configured, the one or more second parameters comprise the scrambling identifier.

7. The data transmission method according to claim 6, wherein the one or more second parameters further comprise at least one of an identifier of a CORESET where a PUCCH is located, an identifier of a search space where the DCI is located, an index of a slot for the transmission of the DCI within a radio frame or radio subframe, and an index of an OFDM symbol for the transmission of the DCI.

8. The data transmission method according to claim 1, wherein the predefined applied scenario comprises at least one of a scenario where the DCI to be transmitted at a Licensed Frequency Band (LFB), a scenario where the DCI is to be transmitted at an Unlicensed Frequency Band (UFB), a scenario where the one or more first parameters comprise the scrambling identifier, and a scenario where the one or more first parameters do not comprise the scrambling identifier, and wherein the high-layer indication information comprises at least one of a frequency band license type, whether the scrambling identifier has been configured, at least one of the one or more first parameters when the scrambling identifier has been configured, and at least one of the one or more first parameters when the scrambling identifier has not been configured.

9. A descrambling method performed by a User Equipment (UE), comprising:

generating a scrambling sequence in accordance with one or more first parameters, the one or more first parameters being determined in accordance with a predefined applied scenario or indication information from a network device, wherein the one or more first parameters comprise a Radio Network Temporary Identity (RNTI); and descrambling scrambled Downlink Control Information (DCI) received from the network device using the generated scrambling sequence, wherein when a scrambling identifier has been configured, the one or more first parameters further comprise the scrambling identifier, wherein the generating the scrambling sequence in accordance with the one or more first parameters comprises:

calculating $c_{init}^{scramble}$ through $c_{init}^{scramble} = (2^{16} \cdot n_{RNTI} + n_{ID}) \bmod 2^{31}$ or $c_{init}^{scramble} = 2^{16} \cdot \lfloor n_{RNTI}/2 \rfloor + n_{ID}$; and generating the scrambling sequence in accordance with $c_{init}^{scramble}$ acquired through calculation, where $c_{init}^{scramble}$ represents a binary number for initializing the scrambling sequence, $n_{RNTI}$ represents the RNTI, and $n_{ID}$ represents the scrambling identifier.

10. The descrambling method according to claim 9, wherein the one or more first parameters further comprise at least one of an Identifier of a Control Resource Set (CORESET) where a Physical Uplink Control Channel (PUCCH) is located, an identifier of a search space where the DCI is located, an index of a slot tor the transmission of the DCI within a radio frame or radio subframe, and an index of an Orthogonal Frequency Division Multiplexing (OFDM) symbol for the transmission of the DCI.

11. The descrambling method according to claim 10, wherein when the one or more first parameters comprise the identifier of the CORESET, the generating the scrambling sequence in accordance with the one or more first parameters comprises:

calculating $c_{init}^{scramble}$ through a formula
$c_{init}^{scramble} = (2^{16} * n_{RNTI} + n_{ID}^{CORESET} + n_{ID}) \bmod 2^{31}$;

and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{CORESET}$ represents CORESET, and $n_{ID}$ represents the scrambling identifier.

12. The descrambling method according to claim 10, wherein when the one or more first parameters comprise the identifier of the search space, the generating the scrambling sequence in accordance with the one or more first parameters comprises:

calculating $c_{init}^{scramble}$ through a formula
$c_{init}^{scramble} = (2^{16} * n_{RNTI} + n_{ID}^{SS} + n_{ID}) \bmod 2^{31}$; and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{SS}$ represents the identifier of the search space, and $n_{ID}$ represents the scrambling identifier.

13. The descrambling method according to claim 10, wherein when the one or more first parameters comprise the index of the slot within the radio frame or radio subframe and the index of the OFDM symbol, the generating the scrambling sequence in accordance with the one or more first parameters comprises:

calculating $c_{init}^{scramble}$ through a formula
$c_{init}^{scramble}=(2^{16}*n_{RNTI}+14n_s+l+1+n_{ID})\bmod 2^{31}$;
and generating the scrambling sequence in accordance with $c_{init}^{scramble}$ acquired through calculation, where $c_{init}^{scramble}$ represents the binary number for initializing the scrambling sequence, $n_{RTNI}$ represents the RNTI, $n_s$ represents the index of the slot within the radio frame or radio subframe, l represents the index of the OFDM, $n_{ID}$, and HID represents the scrambling identifier.

14. The descrambling method according to claim 9, further comprising:
generating a DeModulation Reference Signal (DMRS) sequence in accordance with one or more second parameters, the one or more second parameters being determined in accordance with the predefined applied scenario and/or high-layer indication information; and
demodulating a received data signal using the DMRS sequence, so as to acquire the scrambled DCI.

15. A network device, comprising a memory, a processor, and a computer program stored in the memory and executed by the processor, wherein the processor is configured to execute the computer program so as to implement a data transmission method for the network device, comprising:
generating a scrambling sequence in accordance with one or more first parameters, the one or more first parameters being determined in accordance with a predefined applied scenario and/or high-layer indication information, wherein the one or more first parameters comprise a Radio Network Temporary Identity (RNTI);
scrambling Downlink Control Information (DCI) using the generated scrambling sequence; and
transmitting the scrambled DCI to a User Equipment (UE),
wherein when a scrambling identifier has been configured, the one or more first parameters further comprise the scrambling identifier,
wherein the generating, the scrambling sequence in accordance with the one or more first parameters comprises:

calculating $c_{init}^{scramble}$ through $c_{init}^{scramble}=(2^{16}\cdot n_{RNTI}+n_{ID})\bmod 2^{31}$ or $c_{init}^{scramble}=2^{16}\cdot\lfloor n_{RNTI}/2\rfloor+n_{ID}$; and generating the scrambling sequence in accordance with $c_{init}^{scramble}$ acquired through calculation, where $c_{init}^{scramble}$ represents a binary number for initializing the scrambling sequence, $n_{RNTI}$ represents the RNTI, and $n_{ID}$ represents the scrambling identifier.

16. A User Equipment (UE), comprising a memory, a processor, and a computer program stored in the memory and executed by the processor, wherein the processor is configured to execute the computer program so as to implement the descrambling method according to claim 9.

17. The network device according to claim 15, wherein the predefined applied scenario comprises at least one of a scenario where the DCI to be transmitted at a Licensed Frequency Band (LFB), a scenario where the DCI is to be transmitted at an Unlicensed Frequency Band (UFB), a scenario where the one or more first parameters comprise the scrambling identifier, and a scenario where the one or more first parameters do not comprise the scrambling identifier, and
wherein the high-layer indication information comprises at least one of a frequency band license type, whether the scrambling identifier has been configured, at least one of the one oi more first parameters when the scrambling identifier has been configured, and at least one of the one or more first parameters when the scrambling identifier has not been configured.

18. The network device according to claim 15, wherein the one or more first parameters further comprise at least one of an identifier of a Control Resource Set (CORESET) where a Physical Uplink Control Channel (PUCCH) is located, an identifier of a search space where the DCI is located, an index of a slot for the transmission of the DCI within a radio frame or radio subframe, and an index of an Orthogonal Frequency Division Multiplexing (OFDM) symbol for the transmission of the DCI.

19. The network device according to claim 18, wherein when the one or more first parameters comprise the identifier of the CORESET, the generating the scrambling sequence in accordance with the one or more first parameters comprises:

calculating $c_{init}^{scramble}$ through a formula
$c_{init}^{scramble}=(2^{16}*n_{RNTI}+n_{ID}^{CORESET}+n_{ID})\bmod 2^{31}$; and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{CORESET}$ represents the identifier of the CORESET, and $n_{ID}$ represents the scrambling identifier.

20. The network device according to claim 18, wherein when the one or more first parameters comprise the identifier of the search space, the generating the scrambling sequence in accordance with the one or more first parameters comprises:

calculating $c_{init}^{scramble}$ through a formula
$c_{init}^{scramble}=(2^{16}*n_{RNTI}+n_{ID}^{SS}+n_{ID})\bmod 2^{31}$; and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_{ID}^{SS}$ represents the identifier of the search space, and $n_{ID}$ represents the scrambling identifier, or
wherein when the one or more first parameters comprise the index of the slot within the radio frame or radio subframe and the index of the OFDM symbol, the generating the scrambling sequence in accordance with the one or more first parameters comprises:

calculating $c_{init}^{scramble}$ through a formula
$c_{init}^{scramble}=(2^{16}*n_{RNTI}+14n_s+l+1+n_{ID})\bmod 2^{31}$;
and generating the scrambling sequence in accordance with $c_{init}^{scramble}$ acquired through calculation, where $c_{init}^{scramble}$ represents the binary number for initializing the scrambling sequence, $n_{RNTI}$ represents the RNTI, $n_s$ represents the index of the slot within the radio frame or radio subframe, l represents the index of the OFDM, and $n_{ID}$ represents the scrambling identifier.

* * * * *